(12) United States Patent
Yamaguchi

(10) Patent No.: US 6,349,293 B1
(45) Date of Patent: Feb. 19, 2002

(54) METHOD FOR OPTIMIZATION OF A FUZZY NEURAL NETWORK

(75) Inventor: Masashi Yamaguchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/315,921

(22) Filed: May 20, 1999

(51) Int. Cl.[7] .............................................. G06F 9/445
(52) U.S. Cl. ............................................................ 706/2
(58) Field of Search ........................... 701/106; 706/2, 706/13, 59, 45

(56) References Cited

U.S. PATENT DOCUMENTS

| | | | | |
|---|---|---|---|---|
| 5,701,400 A | * | 12/1997 | Amado | 706/45 |
| 5,761,384 A | * | 6/1998 | Inoue | 706/2 |
| 5,819,242 A | * | 10/1999 | Matsuoka et al. | 706/2 |
| 5,841,949 A | * | 11/1999 | Nakaya et al. | 706/59 |
| 6,032,139 A | * | 2/2000 | Yamaguchi et al. | 706/13 |
| 6,064,996 A | * | 5/2000 | Yamaguchi et al. | 706/13 |
| 6,216,083 B1 | * | 4/2001 | Ulyanov et al. | 706/106 |

FOREIGN PATENT DOCUMENTS

DE  0 659 996 A2  12/1994

OTHER PUBLICATIONS

Apple Advanced Technology Group, Vivarium Program, Artificial Life II Conference Report by Larry Yaeger, (Feb. 5th through 9th, 1990) Sweeney Center, Santa Fe, New Mexico.*
Artificial Evolution: A New Path for Artificial Intelligence? P. Husbands, I. Harvey, D. Cliff, and G. Miller (Brain and Cognition 34, 130–159(1997) Article No. BR970910).*
The Hitch–Hiker's Guide to Evolutionary Computation (FAQ for comp.ai.genetic) by Jorg Heitkotter and david Beasley (1997).*
The design of natural and artificial adaptive systems, Frank, S. A. (1996) pp. 451–505, in Adaption, M. R. Rose and G. V. Lauder, eds. Academic Press, New York.*
Brotherton, Thomas W., et al., *Classifier Design Using Evolutionary Programming*, Pub. Date 1996, pp. 68–75.
Furuhashi, T., et al., Evolutionary Fuzzy Modeling Using Fuzzy Neural Networks and Genetic Algorithm, *IEEE* 1997, pp. 623–627.
Hines, J. Wesley, et al., Signal Validation using an Adaptive Neural Fuzzy Inference System, *Nuclear Technology*, vol. 119, Aug. 1997, pp. 181–193.
Venetsky, L., et al., *Next Generation Test Generator (NGTG) For Analog Circuits*, IEEE, 1997, pp. 113–120.

* cited by examiner

Primary Examiner—Mark R. Powell
Assistant Examiner—Michael B. Holmes
(74) Attorney, Agent, or Firm—Knobbe, Martens, Olson & Bear LLP

(57) ABSTRACT

Optimization of a FNN (FNN)-based controller is described. The optimization includes selecting which input signals will be used by the FNN to compute a desired control output. Output parameters are identified and computed by fuzzy reasoning using a neural network. Adjustment of fuzzy rules and/or membership functions for the FNN is provided by a learning process. The learning process includes selecting candidate input data signals (e.g. selecting candidate sensor signals) as inputs for the FNN. The input data is categorized and coded into a chromosome structure for use by a genetic algorithm. The genetic algorithm is used to select an optimum chromosome (individual). The optimum chromosome specifies the number(s) and type(s) of input data signals for the FNN so as to optimize the operation of the FNN-based control system. The optimized FNN-based control system can be used in many control environments, including control of an internal combustion engine.

18 Claims, 25 Drawing Sheets

Block Diagram For Model-Based Control Unit

Block Diagram For Model-Based Control Unit

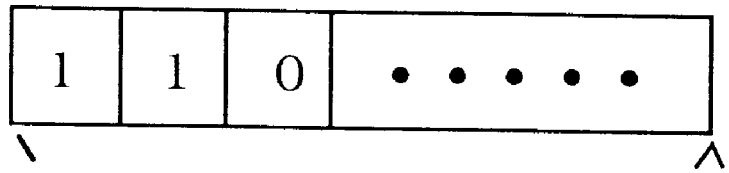

Display whether or not input candidate data is being used.
0: Not using as input data
1: Using as input data Candidate data used for FNN input 1. Average intake pressure in one process
2. Minimum intake pressure in one process
3. Maximum intake pressure in one process
4. Intake pressure at a specific crank angle
5. Changing time from minimum pressure to maximum pressure
6. Changing time from maximum pressure to minimum pressure
7. Difference between maximum pressure and minimum pressure
8. Amplitude of pulsation
9. Cycle of pulsation

*Figure 21*

METHOD FOR OPTIMIZATION OF A FUZZY NEURAL NETWORK

BACKGROUND OF THE INVENTION

1. Field of the Invention

The invention relates to a method for optimizing a Fuzzy Neural Network (FNN), and more particularly, to an improved method for optimizing and training a FNN using genetic algorithms.

2. Description of the Related Art

A Fuzzy Neural Network (FNN), formed by combining a fuzzy inference system and a neural network, possess the advantages of both a fuzzy inference system and a neural network. The fuzzy inference system allows linguistically descriptive algorithms including obscurity, such as decisions by humans, using if-then type fuzzy rules. The neural network allows regulating an input-output relationship by updating coupling coefficients using a learning function.

The FNN allows, for example, modifying the shape of a membership function by using a leaning method such as a back propagation method, wherein a membership function in the first-half portion of a fuzzy inference system is constructed using, for example, a sigmoid function; and the central value and the slope of the membership function of the first-half portion, as well as output of fuzzy rules, are made to correspond to weighting values for coupling in a neural network.

When the number of fuzzy rules is too small, errors in output become large. On the other hand, when the number of fuzzy rules is too high, the probability of outputting appropriate values for inputs other than teacher data is reduced (decreased adaptability). Thus, it is difficult to obtain an appropriate number of fuzzy rules to balance the adaptability and the occurrence of errors. Conventionally, the number of fuzzy rules for a given control object is usually determined through trial and error, and thus, it can take a long time to obtain the appropriate number of fuzzy rules and the proper coefficients for those rules.

Further, due to time-dependent changes in the controlled object, or changes in the surrounding conditions, the appropriate number of fuzzy rules can change. Thus, even when an appropriate number of fuzzy rules has been determined, changes in the controlled object, such as an engine, or changes in the operating environment, may mean that the control system cannot adapt to the changes in a timely manner and satisfactory control cannot be achieved.

In a FNN, antecedent membership functions of the fuzzy reasoning set are realized with various functions including the sigmoidal function. Each membership function typically includes a center position, a slope, and outputs of fuzzy rules corresponding to coupling weights for the neural network. During training, the configurations of the membership functions are modified using learning methods such as the back-propagation.

Because it can learn, the FNN can optimize output information even when the input information is incomplete, unobservable, or estimated. In these instances, selection of the appropriate inputs to achieve optimization of the desired outputs depends on the designer of the FNN. In other words, the designer typically selects the most suitable input information based on a presumption of the desired output information and the expected operating conditions.

For example, in a control system for an internal combustion engine, some desirable input quantities are either too expensive or too difficult to measure economically. One such quantity is the volume of airflow into the engine (i.e., the volume of the intake air charge to the cylinders). Measuring the input airflow usually requires an expensive sensor known as an airflow meter. Another such quantity is the adhesion rate of the fuel that adheres on internal walls of intake manifolds or the like. Another such quantity is the evaporation speed of the adhered fuel.

Some desirable input quantities are obtained indirectly, i.e., estimated from other information sensed with a common sensor in an attempt to reduce the number of the sensors that measure engine performance.

In addition to the large number of possible input sensors, there are often large amounts of input data that must be processed to obtain each control output. As the number of input sensors increases, so does the processing load. The processing load can be reduced by carefully selecting the desired inputs (i.e. sensors), but it can be difficult to select the most suitable input information. Clearly, the control system designer is faced with a daunting task when selecting the optimal input information for a complex device such as an engine.

SUMMARY OF THE INVENTION

The present invention solves these and other problems by providing a method and apparatus for optimizing a FNN whereby input information, and combinations thereof, that are most useful for computing a desired control output are selected. In one embodiment, a FNN calculation process for fuzzy reasoning values includes a neural network structure. Output parameters are identified and computed by fuzzy reasoning using the neural network. An adjustment of fuzzy rules and/or membership functions is provided by a learning process. The learning process includes selecting candidate input data types (e.g. selecting sensors) that can provide input data for the fuzzy neural network. The input data is categorized and coded into chromosomes (individuals) for use by a genetic algorithm. The genetic algorithm is used to optimize the chromosomes, by evolving and selecting the individuals (chromosomes) that specify the number(s) and type(s) of input data for the FNN so as to optimize the operation of a controller that uses the FNN.

In one embodiment, the optimization method for the FNN also includes coding the coupling load corresponding to the FNN membership functions into the chromosomes, and evolving these individuals with the genetic algorithm using a desried fitness function.

In one embodiment, the optimized FNN is employed for control of an Internal Combustion Engine engine control, and the candidate input data types include data relating to operation of the engine.

In one embodiment, the input "candidate" data types include intake pressure. In one embodiment, the FNN output data includes an engine air intake volume. In one embodiment, the input candidate data types include combustion chamber pressure, engine speed (i.e. revolutions per minute), fluctuation of the engine speed, and/or air intake volume. In one embodiment, control output data includes torque fluctuations of the engine. In one embodiment, the candidate input data types include intake manifold wall temperature, an ambient temperature of the intake manifold, and/or elapsed time from engine start. In one embodiment, output data includes a combustion chamber temperature of the engine.

In one embodiment, candidate input data includes engine coolant (e.g. water) temperature, oil temperature, and/or engine temperature. In one embodiment, output data includes intake manifold wall temperature.

In one embodiment, the candidate input data includes intake manifold wall temperature, engine speed (revolutions), air intake volume and/or intake air pressure (including pressures below ambient). In one embodiment, output data includes an evaporation time constant for fuel injected into the intake manifold.

In one embodiment, candidate input data includes engine speed, air intake volume and/or intake air pressure. In one embodiment, output data includes flow rate and timing of fuel injected into the intake manifold.

In one embodiment, candidate input data includes a fluctuation rate of a throttle angle and/or a fluctuation rate of the engine speed.

BRIEF DESCRIPTION OF THE DRAWINGS

These and other features of the invention will now be described with reference to the drawings in which:

FIG. 21 shows a portion of a chromosome structure for encoding coupling coefficients of the FNN, as genetic information.

Figure 1:
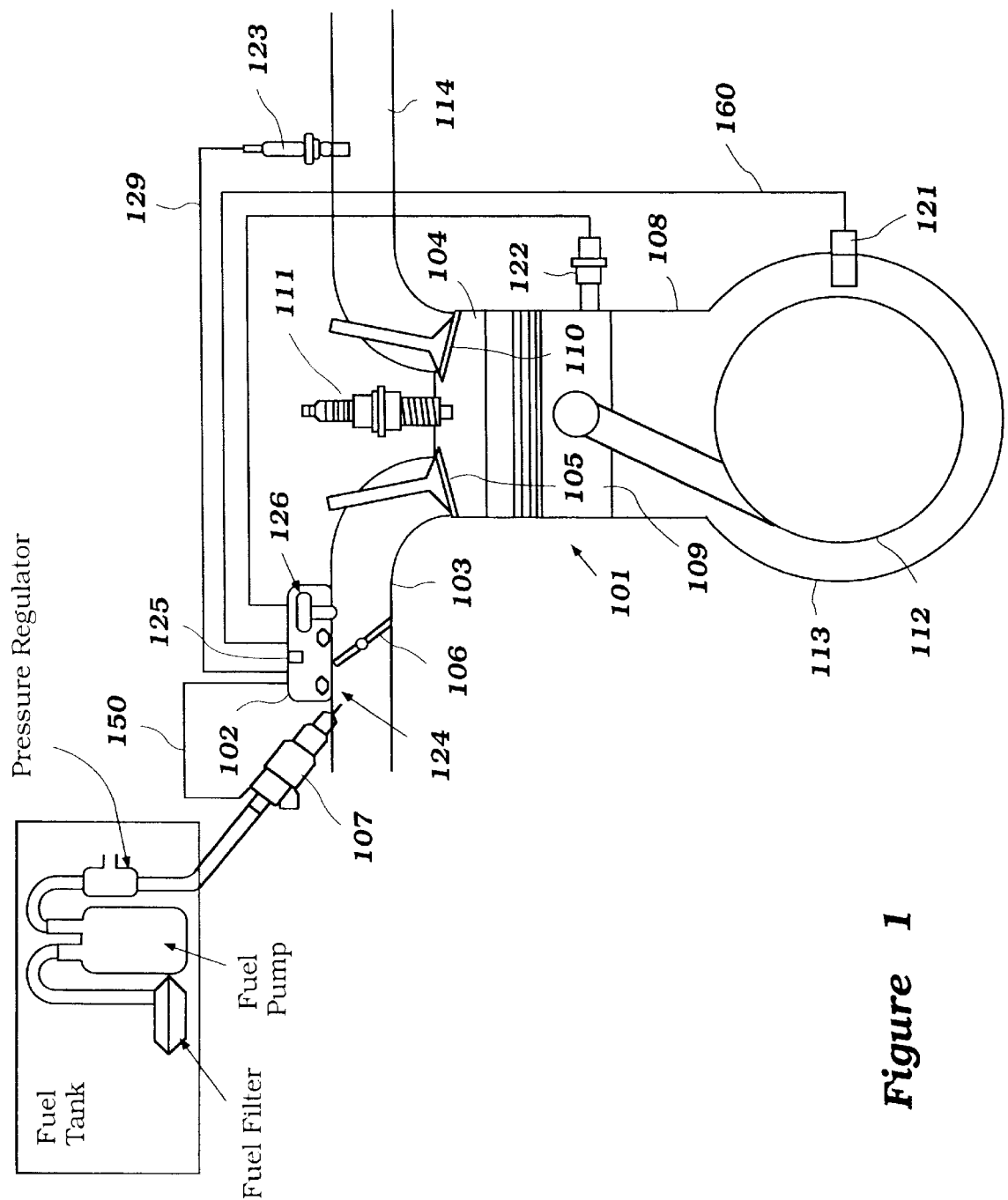
FIG. 1 is a schematic diagram showing an engine, a FNN-based control device that is provided with a genetically optimized FNN for realizing a control of the air/fuel ratio.

In the drawings, like reference numbers are used to indicate like or functionally similar elements. The first digit of each three-digit reference number generally indicates the figure number in which the referenced item first appears. The first two digits of each four-digit reference number generally indicate the figure number in which the referenced item first appears.

DETAILED DESCRIPTION OF THE PREFERRED EMBODIMENT

FIG. 1 illustrates, schematically, an engine 101, a control system 102 that uses a FNN for realizing control of the Air/Fuel (A/F) ratio in the engine 101.

The engine 101 operates on a four-stroke principle. The engine 101 has an air intake manifold 103 that admits air into a combustion chamber 104 through an intake valve 105. A throttle valve 106 is provided in the air intake manifold 103 to control the volume of airflow. The intake manifold 103 is also provided with a fuel injection device 107 that injects pressurized fuel into the air intake manifold 103. The air is mixed with the injected fuel and the fuel/air mixture introduced into the combustion chamber 104. The combustion chamber 104 is defined by a cylinder block 108, a cylinder head, a piston 109 that reciprocates within the cylinder block 108, the intake valve 105 and an exhaust valve 110. A spark plug 111 is provided at the cylinder head so as to be exposed into the combustion chamber 104. The spark plug 111 is fired to burn the mixture in the combustion chamber 104 to push down the piston 109 and thereby rotate a crankshaft 112 that is connected with the piston 109 and positioned in a crankcase 113. Burnt mixture is discharged through the exhaust valve 110 and exhaust manifold 114 as emission.

The ratio of the air versus fuel, also known as the A/F ratio, is an important factor for achieving good combustion performance and low emissions. The control system 102 is a device for controlling the A/F ratio by changing the amount of fuel injected by the fuel injector 103 in response to openings of the throttle valve 106. If the air fuel ratio is kept in an appropriate range, combustion of the Air/Fuel mixture and emissions are also maintained in a desired state.

The control system 102 can be, as shown in FIG. 1, mounted on the air intake manifold 103. Sensors for sending signals associated with sensed conditions to the control system 102 are provided at appropriate places on the engine 101. Some of the sensors include: a crank angle sensor 121 attached at the crankcase 113; an engine temperature sensor 122 attached at the cylinder block 108; and an A/F ratio sensor 123 attached at the exhaust manifold 114. The crank angle sensor 121 provides a crank angle signal 160 to the control system 102. The A/F sensor 123 provides an A/F signal 129 to the control system 102.

The A/F ratio sensor 123 is preferably an oxygen ($O_2$) sensor and can be attached at the cylinder block 108 or the cylinder head so as to be exposed to the combustion chamber 104.

Other sensors include: an intake manifold (negative) pressure sensor 124, an atmospheric temperature sensor 125; and an air intake manifold inner wall temperature sensor 126. Outputs from the sensors 124, 125 and 126 are provided to inputs of the control system 102.

An injector signal 150 output from the control system 102 is provided to the fuel injector 103 to control the amount of fuel injected by the fuel injector 103. In response to the injector signal 150, the fuel injector 103 injects the specified amount of fuel into the air intake manifold 103. A first embodiment of the control system 102 is described in the text below in connection with FIGS. 2–16. A second embodiment of the control system 102 is described in the text below in connection with FIGS. 17–25.

Figure 2:
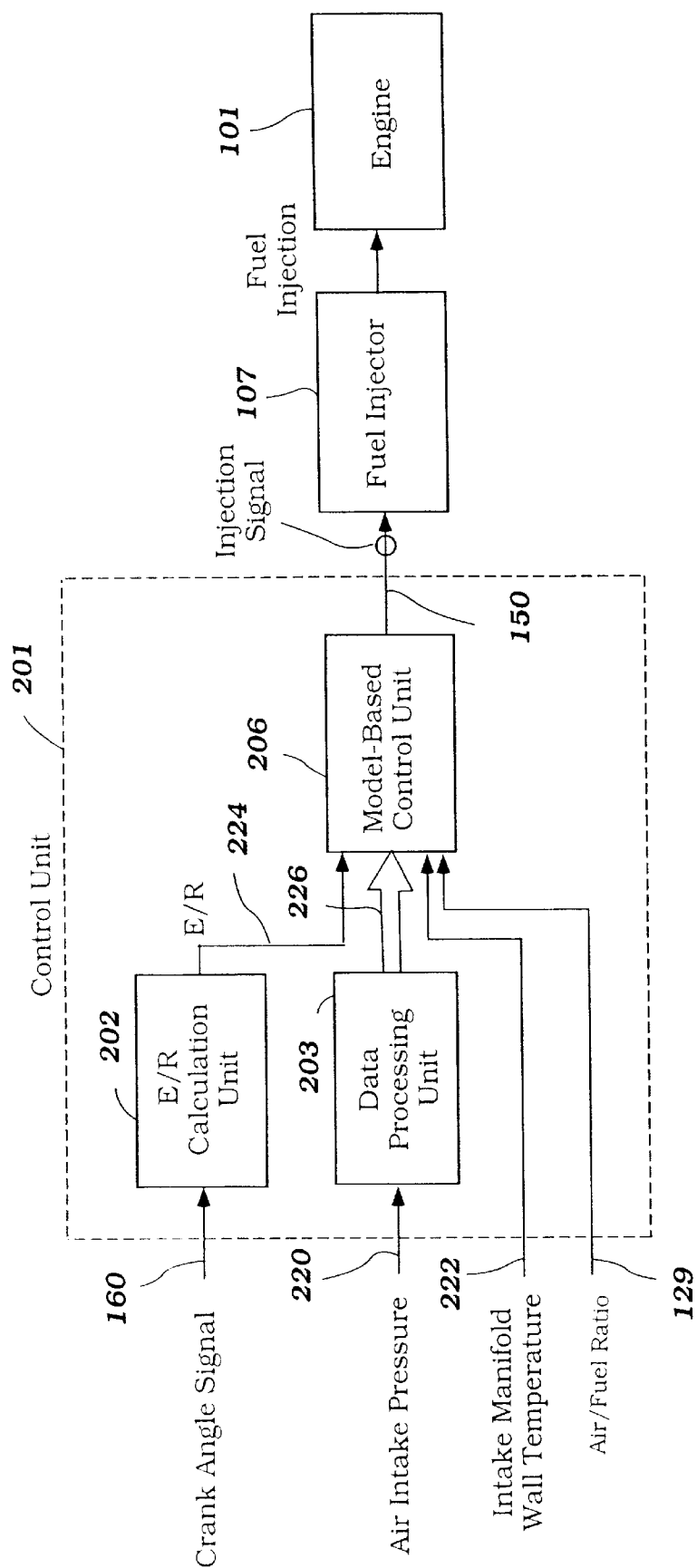
FIG. 2 is a block diagram showing a first engine control system.

FIG. 2 is a block diagram showing a control system 201 as a first embodiment of the control system 102. The control system 201 comprises an engine speed module 202, a pressure data module 203 for transforming air intake pressure data, and a model-base control module 206. The engine speed calculation module 202 calculates engine speeds based upon the crank angle signal 160 by comparing a crank angle signal with time. The pressure data module 203 transforms the intake pressure signal 220 (provided by the air intake manifold negative pressure sensor 124) into a group of pressure signals 226. The model-based control module 206 accepts the engine speed signal 224, the pressure signals 226, the intake manifold (inner) wall temperature signal 222, and the A/F ratio signal 129. An output of the model-based control module 206 is the injector signal 150.

Figure 3:
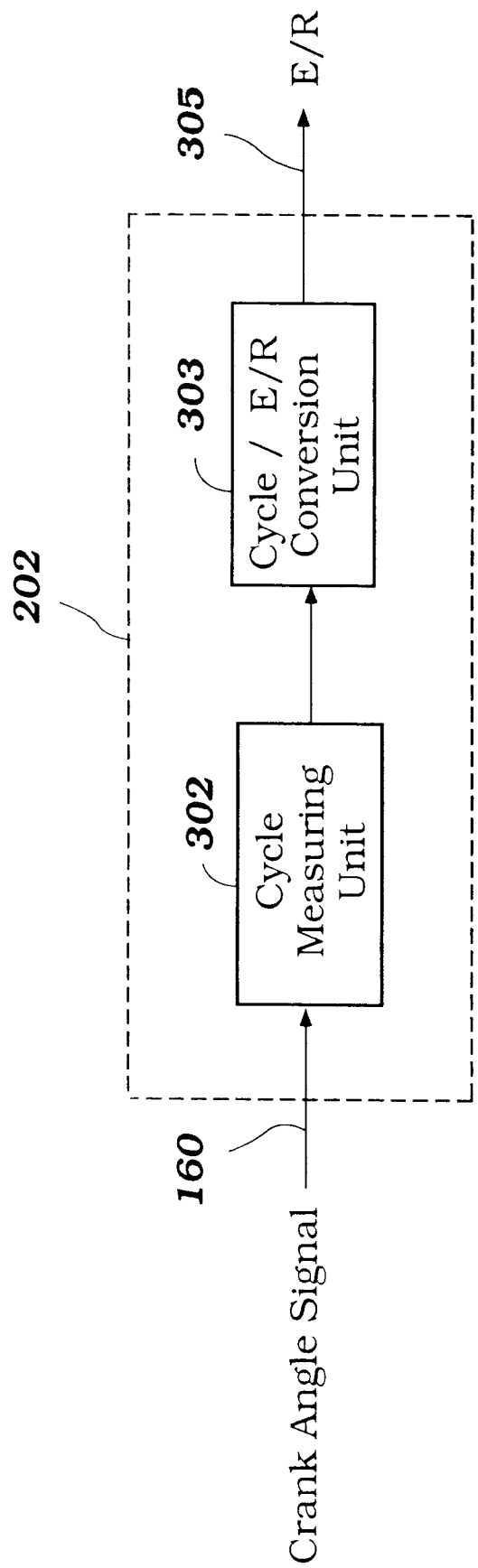
FIG. 3 is a block diagram showing an engine speed module for calculating engine speed from data provided by a crank angle sensor.

FIG. 3 is a block diagram of the engine speed module 202 shown in FIG. 2. The engine speed module 202 includes a cycle module 302 for detecting the crank angle signal 160 and an E/R calculator module 303 for converting the measured cycle signal into an Engine Rotation (E/R) speed signal E/R 305.

Figure 4:
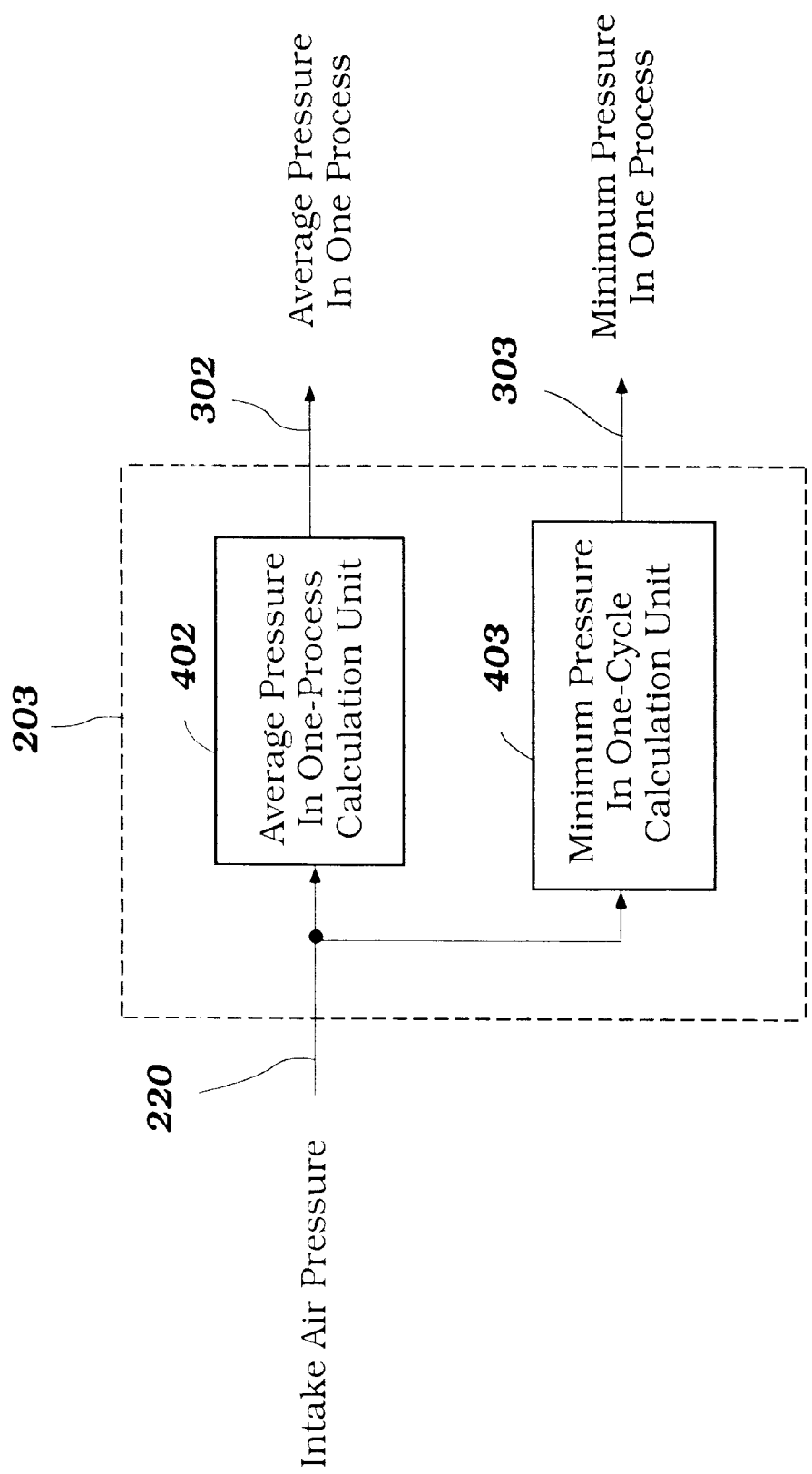
FIG. 4 is a block diagram showing a transform module for transforming pressure data, for use in the control system shown in FIG. 2.

FIG. 4 is a block diagram of the pressure data module 203 shown in FIG. 2. The pressure data module 203 includes an averaging module 402 for calculating an average pressure per stroke and a minimum pressure module 403 for detecting the minimum pressure per stroke. The intake air pressure signal 220 is provided to an input of the averaging module 402 and to an input of the minimum pressure module 403. An average pressure signal 302 is provided by an output of the average pressure module 402. A minimum pressure signal 303 is provided by an output of the minimum pressure module 403.

Figure 5:
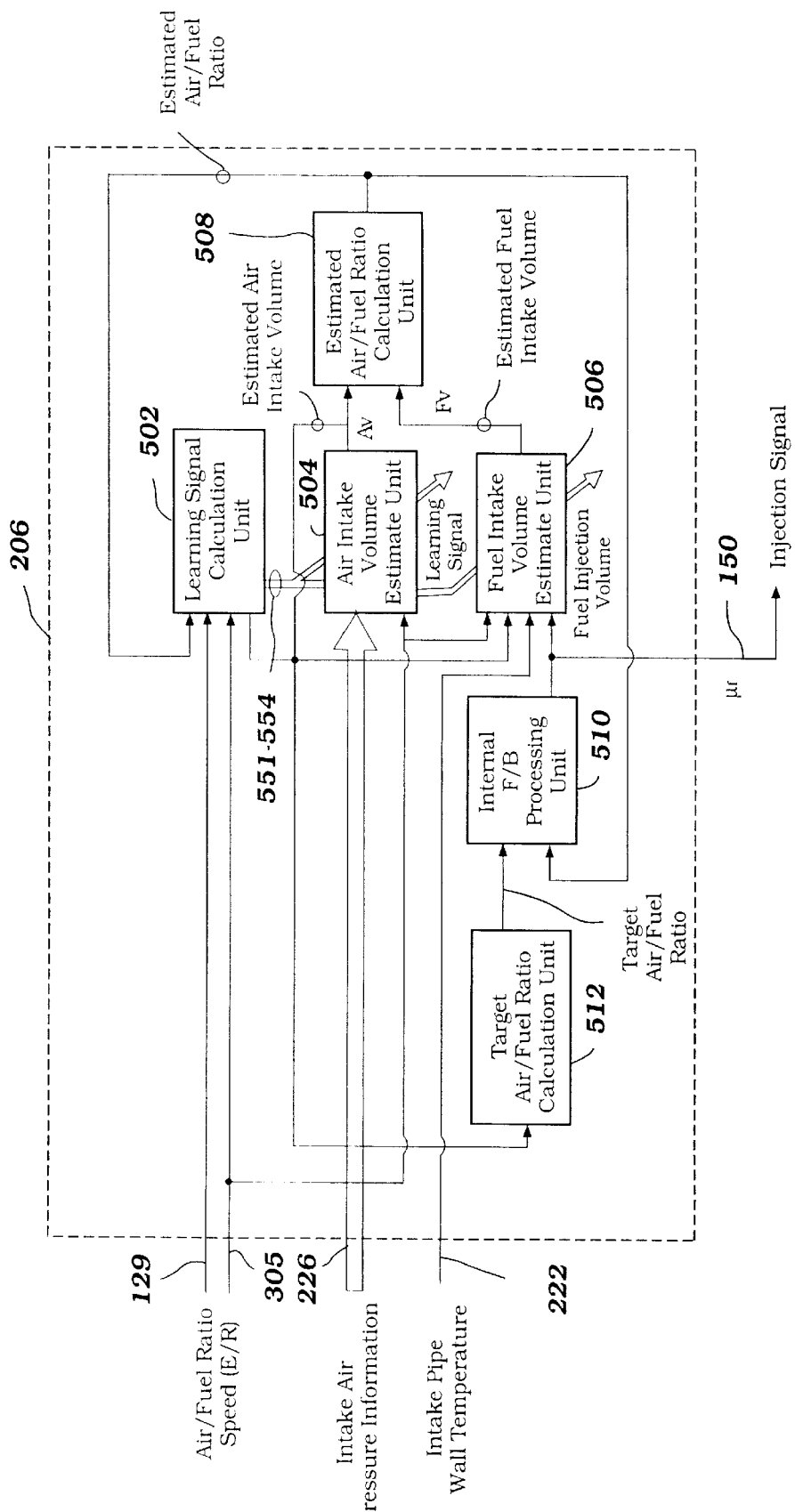
FIG. 5 is a block diagram showing a model-based control system for use in the engine control system shown in FIG. 2.

FIG. 5 is a block diagram of the model-based control module 206 shown in FIG. 2. The model-based control module 206 includes a learning module 502, an air intake volume estimator 504 (also known as an intake forward model 504), a fuel volume estimator 506, a A/F estimator 508, a feedback module 510 and a target A/F ratio module 512.

The intake air estimator 504 is a forward model of the air charge system that is based on the behavior of the airflow in the air intake manifold 103. The intake air estimator 504 accepts the pressure signals 226 and the E/R signal 305 and provides a estimated air volume. The fuel volume estimator 506 is a forward model of the fuel system and is based on behavior of the fuel injected into the air intake manifold 103 by the fuel injector 107. The fuel volume estimator 506 accepts the E/R signal 305, the estimated intake air signal 504, the intake manifold wall temperature signal 222, and the injector control signal 150; and provides an estimated A/F ratio signal.

The A/F estimator 508 accepts the estimated intake air volume signal and the estimated fuel intake volume signal and provides the estimated air fuel ratio signal. The target A/F module 512 accepts the estimated intake air volume signal and provides a target A/F ratio signal. The feedback module 510 accepts the target A/F ratio signal and the estimated A/F ratio and produces the injection signal 150.

The learning module 502 accepts the A/F ratio signal 129 provided by the air fuel ratio sensor 123, the E/R signal 305, the estimated intake air volume signal, and the estimated A/F ratio signal; and provides learning data signals 551–554 to a learning input of the air intake volume estimator 504 and to a learning input of the fuel intake volume estimator 506.

Figure 6:
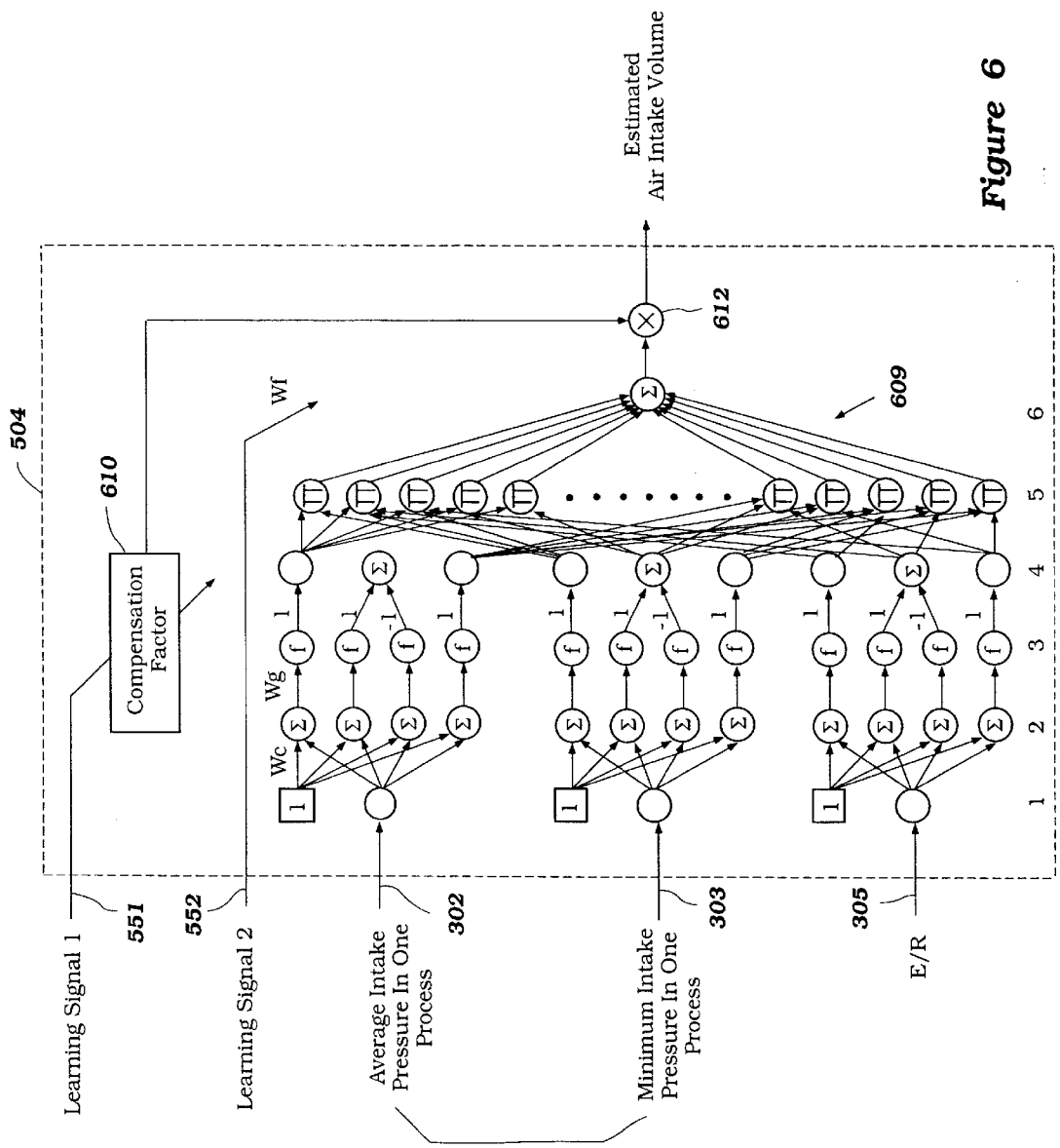
FIG. 6 is a block diagram showing a module for calculating an estimated intake air volume, for use in the model-based control system shown in FIG. 5.

FIG. 6 is a block diagram of the intake air volume estimator 504. The intake air volume estimator 504 includes a FNN 609. The FNN 609 accepts data associated with operational states of the engine 101, including, an average pressure signal 302 (the average pressure per stroke), and a minimum pressure signal 303 (indicating the minimum pressure per stroke).

The FNN 609 has a stratified (layered) architecture with six processing strata. The first four strata are antecedent parts. The fifth and sixth strata are consequent parts.

The respective input signals 302, 303, and 305 are each provided to a plurality of membership functions that are defined with the sigmoid equation as follows:

$$F(x)=1/[1+\exp\{-w_g(x_i+w_c)\}]$$

That is, the membership functions are expressed with the sigmoidal functions where the parameter $w_c$ represents the center position and the parameter $w_g$ represents the slope of the sigmoidal functions. The parameter $w_c$ and the parameter $w_g$ are inserted into the neural network as its coupling coefficients.

Further, the consequent parts are allotted to fuzzy rules corresponding to the number of the membership functions of the antecedent parts. Respective outputs of these fuzzy rules are indicated with the coupling coefficient $w_f$. The coupling coefficients $w_f$ and the grades of the antecedent membership functions corresponding to the respective coupling coefficient $w_f$ are multiplied and then summed together. The calculated value is outputted as the estimated value by the method of elastic center, i.e., estimated intake air amount.

As described above, the FNN 609 is a hierarchical FNN composed of six strata (layers), wherein layers from a first layer through a fourth layer constitute a first portion, and layers from a fifth layer to a sixth layer constitute a second portion of the network.

In one embodiment, at the first portion, the average intake pressure signal 302 has three membership functions, A11, A12, and A13. The minimum intake pressure signal 303 has three membership functions A21, A22, and A23. The E/R signal 305 has three membership functions A31, A32, and A33. Input domains at the second portion (i.e., input at the fifth layer) are divided into 27 fuzzy rule domains (3×6=18).

In FIG. 6, $w_c$, $w_g$, $w_f$, "1", and "−1" indicate coupling loads between units represented by circles. The units represented by squares at the first layer indicate bias units which constantly output a value 1.0 (one).

Each of the units at the third layer has a sigmoid function, which shapes the membership functions at the first-half portion.

In the FNN 609, the average intake pressure 302, the minimum intake pressure 303, and the E/R (engine speed) 305 are provided to the respective units at the first layer. The coupling loads $w_c$ are added as a bias at the second layer. An input of each unit at the third layer is obtained by multiplying the corresponding output of the unit at the second layer by the corresponding $w_g$. Thus, the output of the unit at the third layer is expressed as follows:

$$f(x)=1/(1+\exp(-w_g(x_i+w_c)))$$

In the above, $x_i$ is $x_1$, $x_2$, or $x_3$. The coupling loads $w_g$ and $w_c$ are parameters for determining the slope and the central value of the sigmoid function. The coupling loads $w_g$ and $w_c$ are set at appropriate values for each sigmoid function, as a result of learning provided by the learning signal 552.

Accordingly, as output of the fourth layer, membership functions A11, A12, A13, A21, A22, A23, A31, A32, and A33 can be obtained at the first-half portion, which cover certain ranges of engine speeds and pressures.

In the above, membership functions, A11, A12, and A13 denote that the average intake pressure 302 is in a "low range", "intermediate range", and "high range", respectively. Functions A21, A22, and A23 denote that the minimum intake pressure 303 is in a "low range", "intermediate range", and "high range", respectively. Functions A31, A32, and A33 denote that the engine speed E/R 305 is "small", "intermediate", and "large", respectively.

In this example, at the second-half portion, 18 fuzzy rules (3×6=18) are generated, and at the fifth layer, adaptability for each fuzzy rule is calculated based on the grade of the membership functions at the first-half portion.

The fuzzy rules are determined for each combination of the membership function of the engine speed at the first portion and the membership function of the pressures at the first portion as follows: "if engine speed is membership function $A_{3n}$ (n=1 . . . 3) at the first portion, and average pressure is membership function $A_{1n}$ (n=1 . . . 3), and minimum pressure is membership function $A_{2n}$ (n=1 . . . 3); then x is coupling load $w_f$." That is, each coupling load $w_f$ is a parameter that indicates an output of a fuzzy rule. Each coupling load $w_f$ is set at an appropriate value through learning, e.g., "when engine speed is in a high range, and average pressure intermediate, and minimum pressure is intermediate: then x volume $w_f$ is 50%", or "when engine speed is in a low range, average pressure intermediate, and minimum pressure is intermediate: then x volume $w_f$ is 70%." At the sixth layer, the sum of adaptability for each fuzzy rule at the first-half portion, which is calculated at the fifth layer, and coupling load $w_f$, which means output of the fuzzy rule, is integrated. This integrated sum is an estimated value of x (where x is the unscaled estimated air intake volume).

The estimated air intake volume is obtained by multiplying the unscaled estimated air intake volume x by a compensation factor provided by a compensation factor module 610. The learning signal 551 is provided to a learning input of the compensation factor module 610.

The number and variety of the inputs to the FNN 609, the coupling coefficients $w_c$ representing the center positions of the membership functions, the coupling coefficients $w_g$ representing the slopes of the membership functions and the number of the membership functions corresponding to the respective inputs are associated with genes of a chromosome structure described below in connection with FIG. 8. The FNN 609 is optimized (trained) by using a genetic algorithm to search for an optimal chromosome.

Figure 7:
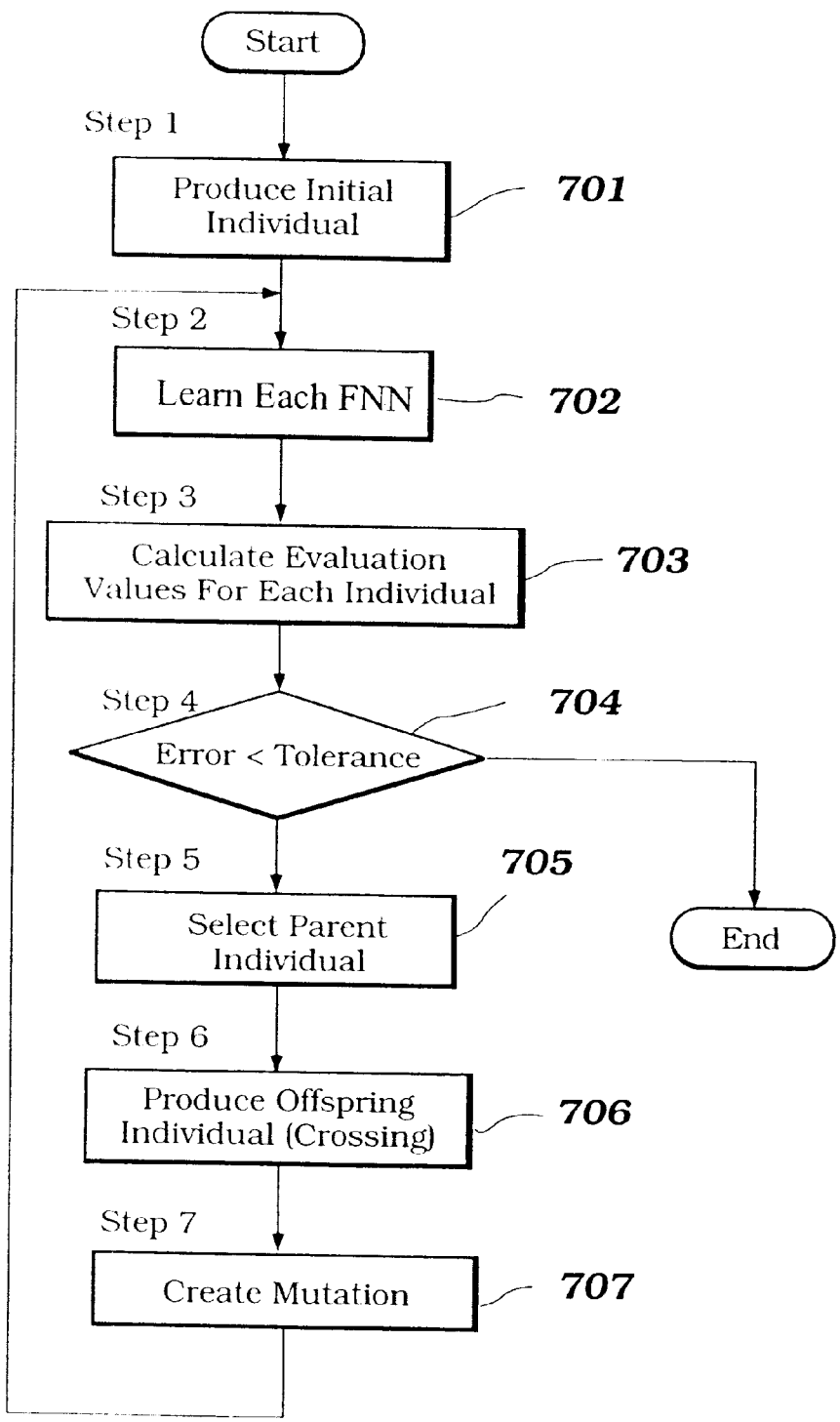
FIG. 7 is a flowchart showing optimization of a FNN using a genetic algorithm.

FIG. 7 is a flowchart showing optimization of a FNN, such as the FNN 609, using a genetic algorithm. The flowchart process begins at a process block 701 where an initial set of chromosomes of individuals is produced. The process then proceeds to a process block 702 where each individual chromosome is used to train the FNN. After training, the process advances to a process block 703 where a genetic fitness function (an evaluation function) is calculated for each individual using the FNN as trained for that individual. After computing the fitness functions, the process advances to a process block 704 where the values produced by evaluating the fitness functions are compared to a tolerance value. If an individual chromosome is found that provides a desired tolerance, then that chromosome is selected as the optimum chromosome and the genetic optimization exits. If no suitable individual is found, the process advances to a process block 705 where the best individuals are selected to be parents for the next generation of chromosomes. After selecting the parents, the process advances to a process block 706 where offspring are calculated by crossing genes between the parent chromosomes. After crossing, the process advances to a process block 707 where mutations are introduced into the chromosomes. After mutating the genes, the process jumps back to the process block 702 to evaluate the new generation of chromosomes.

Figure 8:
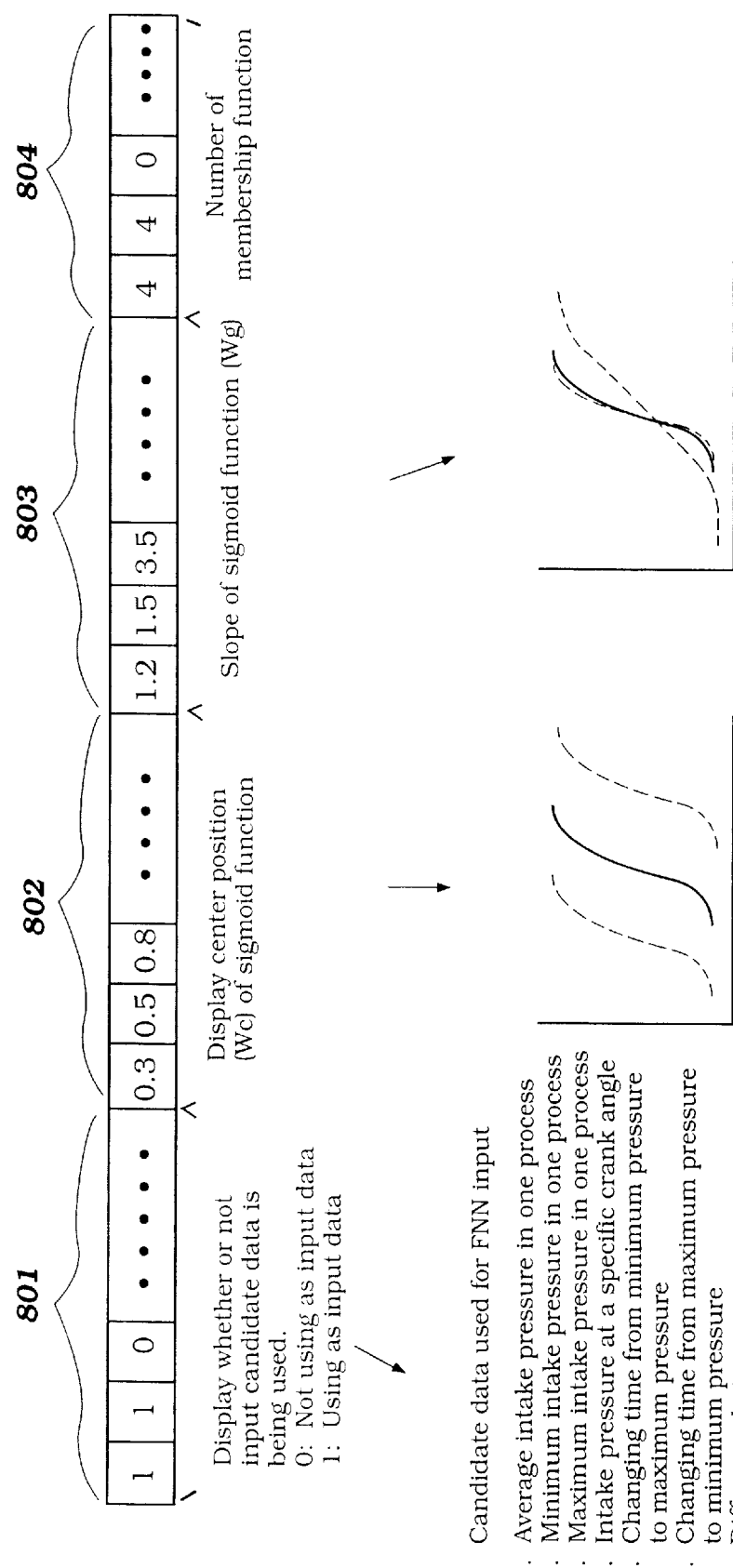
FIG. 8 shows an example of a chromosome that has coupling coefficients of the FNN encoded as genetic information (genes), so that the optimal coupling coefficients can be optimized using a genetic algorithm.

FIG. 8 shows an example of a chromosome that has coupling coefficients of the FNN encoded as genetic information (genes), so that the optimal coupling coefficients can be found using a genetic algorithm. FIG. 8 shows a chromosome configured as a first gene group 801, a second gene group 802, a third gene group 803, and a fourth gene group 804. Each group has nine genes, where each of the nine genes corresponds to a particular type of engine data as listed below:

1. Average intake pressure in an engine stroke.
2. Minimum intake pressure in an engine stroke.
3. Maximum intake pressure in an engine stroke.
4. Intake pressure at a specific crank angle.
5. Time interval between minimum pressure to maximum pressure.
6. Time interval between maximum pressure to minimum pressure.
7. Difference between maximum pressure and minimum pressure.
8. Amplitude of pulsation.
9. Cycle of pulsation.

Genes in the first group are binary genes that indicate whether or not that input type is used, a zero indicating that the input is not used, a one indicating that the input is used. Genes in the second group 802 contain the center position $w_c$ of a sigmoid function in the FNN. Genes in the third group 803 contain the slope $w_g$ of the sigmoid function in the FNN. Genes in the fourth group 804 contain the number of the membership function for the corresponding $w_c$ and $w_g$.

Figure 9:
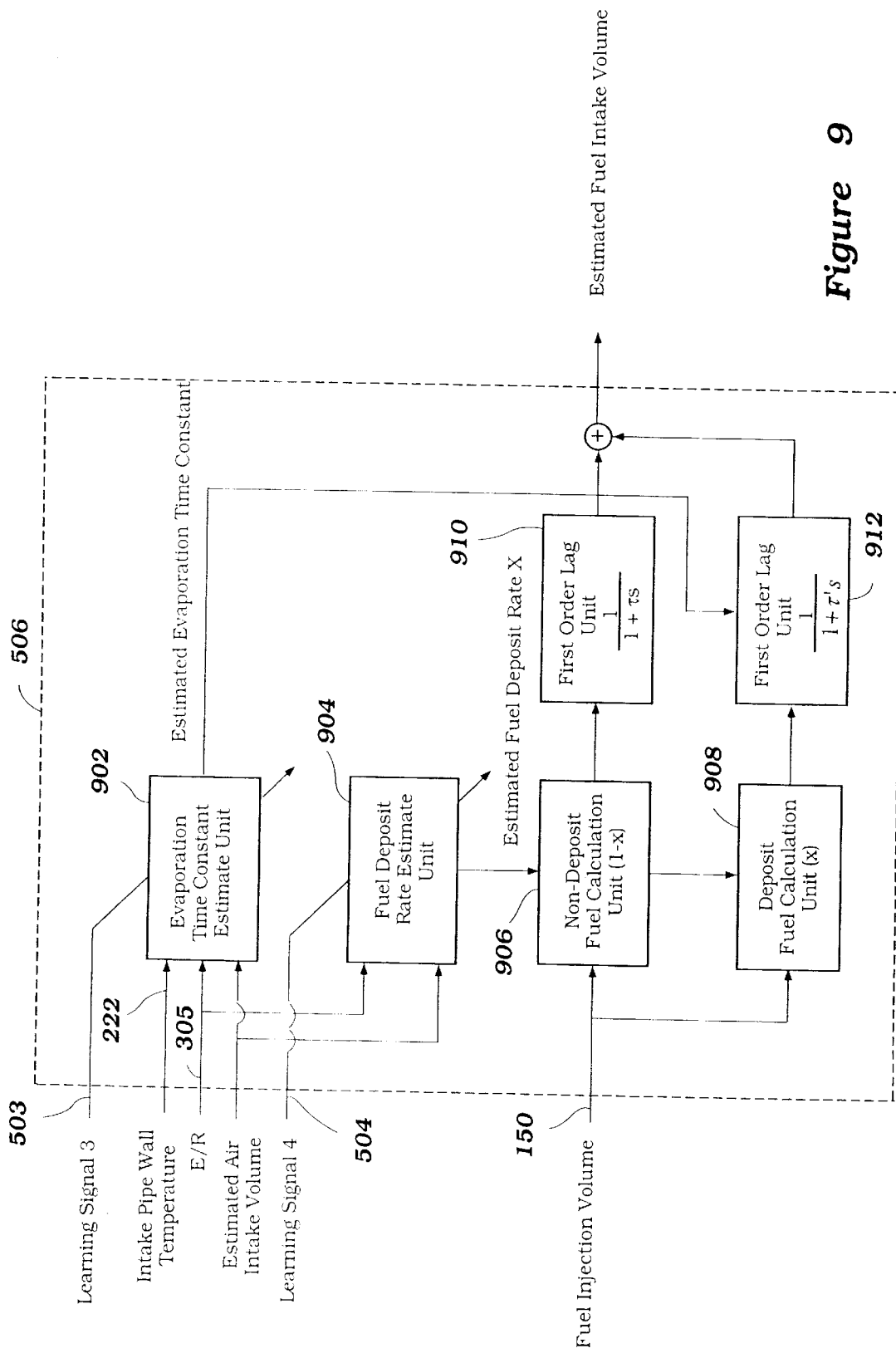
FIG. 9 is a block diagram showing a module for calculating an estimated fuel intake volume, for use in the model-based control system shown in FIG. 5.

FIG. 9 is a block diagram of the fuel volume estimator (i.e. fuel deposition forward model) module 506 shown in FIG. 5. The fuel deposition forward model 506 models the behavior of fuel injected from the fuel injector 107.

The fuel deposition forward model 506 includes a non-deposit fuel estimator 906, a deposit fuel estimator 908, first-order lag units 910 and 912, a fuel deposition rate estimator 904, and a time constant-of-evaporation estimator 902. The fuel deposition forward model 506 estimates a quantity Fv of fuel actually introduced into the cylinder based on the fuel injector signal 150.

The fuel deposition rate estimator 904 receives the engine speed signal E/R 305 and the estimated air intake volume, and based on this information, estimates a ratio r (hereinafter referred to as "fuel deposition ratio") of the fuel deposited on a wall of the intake manifold 103 to the fuel injected by the fuel injector 107.

The time constant-of-evaporation estimator 902 includes a FNN that receives the engine speed signal E/R 305, the estimated air intake volume, and the intake pipe wall temperature $T_e$ 222 (the temperature of the engine water), and which outputs a time constant $\tau$ for evaporation of the fuel deposited on the wall (hereinafter, referred to as "time constant of evaporation $\tau$").

The non-deposit fuel estimator 906 estimates the fuel quantity entering directly the cylinder from the fuel injector 107 based on the fuel injection signal 150.

The deposit fuel estimator 908 estimates the fuel quantity entering the cylinder after once being deposited on a wall based on the fuel injector signal 150 and based on the fuel deposition rate r outputted from the fuel deposition ratio estimator 904.

The fuel quantity obtained by the non-deposit fuel estimator 906 and the deposit fuel estimator 908 are approximated to a first-order lag system based on the time constants of evaporation $\tau 1$ and $\tau 2$ obtained from the time constant-of-evaporation estimator 902, and then summed to output it as the estimated fuel quantity Fv from the fuel deposition forward model 506.

The fuel deposition forward model 506 is a simple first-order lag system, and thus, when performing feedback control using the output of the fuel deposition forward model 506, a relatively large feedback gain can be used, thereby providing a more accurate inverse model for appropriate basic operation, even during a transient state.

The learning signal 504 is provided to train the FNN in the fuel deposition ratio estimator 904. The learning signal 503 is provided to train the FNN in the time constant-of-evaporation estimator 902.

As explained above, in the controller 206, the air intake estimator 504, the fuel deposition ratio estimator 904, and the time constant-of-evaporation estimator 902 in the air flow forward model 506 use fuzzy neural networks. Thus, it is possible to cause the models to approximate the actual engine conditions due to the learning function provided by the fuzzy neural networks in the models, thereby controlling the A/F ratio in the optimum range in accordance with changes in the surrounding environments or changes in the engine over time.

The FNN in each model has the structure of an autonomic system to obtain the fuzzy rules and the membership functions. Thus, initial learning becomes relatively simple. Even when errors between the models and the actual engine caused by the environmental changes and changes in the engine over time cannot be satisfactorily fixed solely by the learning function, the models can be adjusted by changing the structures of the models, by themselves in an autonomic way, to match the models with the actual engine. Thus, it is possible to control the A/F ratio of the engine 101 in accordance with changes in the surrounding environments and changes in the engine over time even when the changes are intense or drastic, e.g., when impurities enter into the engine.

Further, the controller 506 has structures wherein the phases of the air flow forward model (estimator) 504 and the fuel deposition forward model (estimator) 506, which estimate the air volume Av and the fuel quantity Fv, are advanced to a degree equivalent to the dead time at the model-based controller 206, and wherein the estimated control value Ev 150, obtained based on the estimated air volume Av and the estimated fuel quantity Fv obtained from the air flow forward model 504 and the fuel deposition forward model 506, is subjected to feedback to obtain the injector control signal Mf 150, thereby constituting an inverse model. Using the inverse model, the fuel deposition forward model 506 included in the feedback group of the inverse model can simply be a first-order lag system, and thus, a large feedback gain can be used in the inverse model. Accordingly, as compared with map control, for example, the control system using the inverse model improves, to a great extent, controllability of the A/F ratio during a transient state of the engine, and prevents the air-fuel ratio from suddenly changing from the target value to a rich ratio or a lean ratio.

Figure 10:
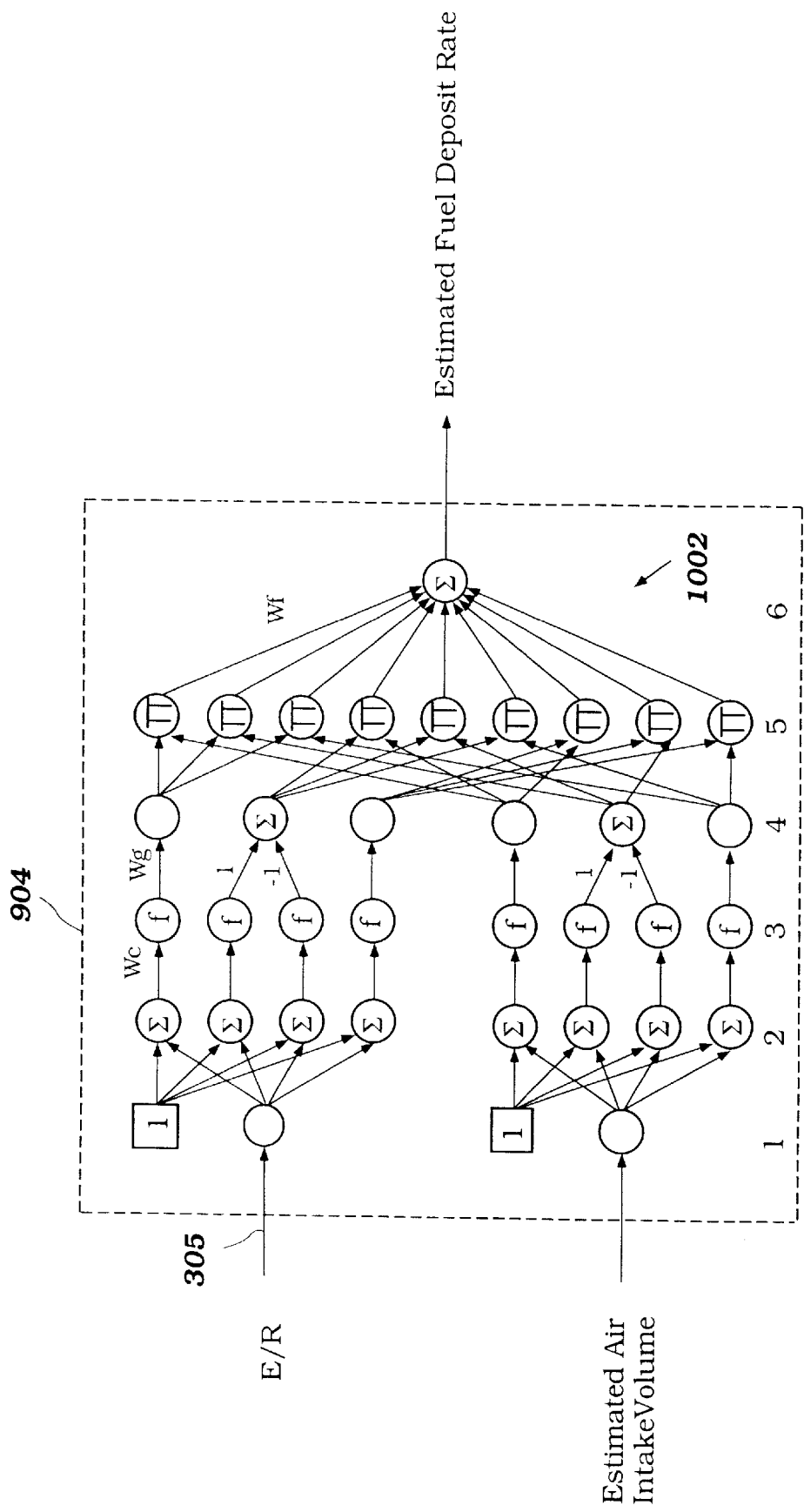
FIG. 10 is a block diagram showing a module for calculating a estimated fuel deposit rate (i.e., the amount of fuel adhering to an inner wall of the intake manifold or the like), for use in the model-based control system shown in FIG. 5.

FIG. 10 is a block diagram showing a FNN 1002 in the fuel deposit estimator 904 for calculating an estimated fuel deposit rate (i.e., the amount of fuel adhering to an inner wall of the intake manifold or the like). The FNN 1002 has two inputs: the engine speed E/R 305; and the estimated air intake volume. The FNN 1002 is a six-layer network and functions in a manner similar to the FNN 609 described in connection with FIG. 6 above, except that in the FNN 1002, there are only 9 rules (3×3=9) in the fifth layer.

Figure 11:
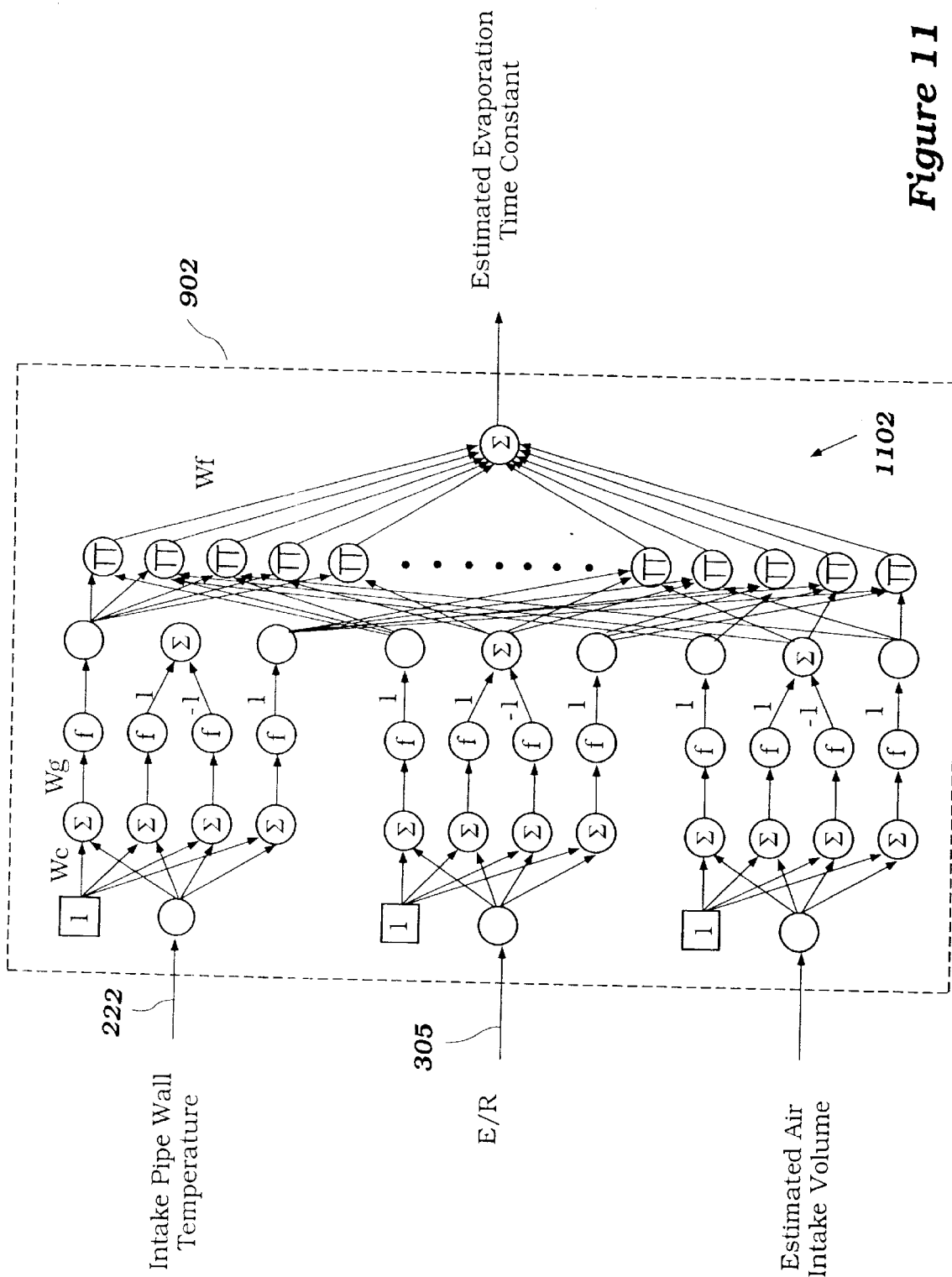
FIG. 11 is a block diagram showing a module for calculating a estimated evaporation time constant for use in the model base control system shown in FIG. 5.

FIG. 11 is a block diagram of the evaporation-time-constant estimator 902, for calculating the estimated evaporation time constant. The estimator 902 is based on a FNN 1102 having three inputs: the intake manifold wall temperature 222; the engine speed E/R 305; and the estimated air intake volume. The FNN 1102 is a three-input, six-layer FNN similar to the FNN 609 described in connection with FIG. 6 above.

Figure 12:
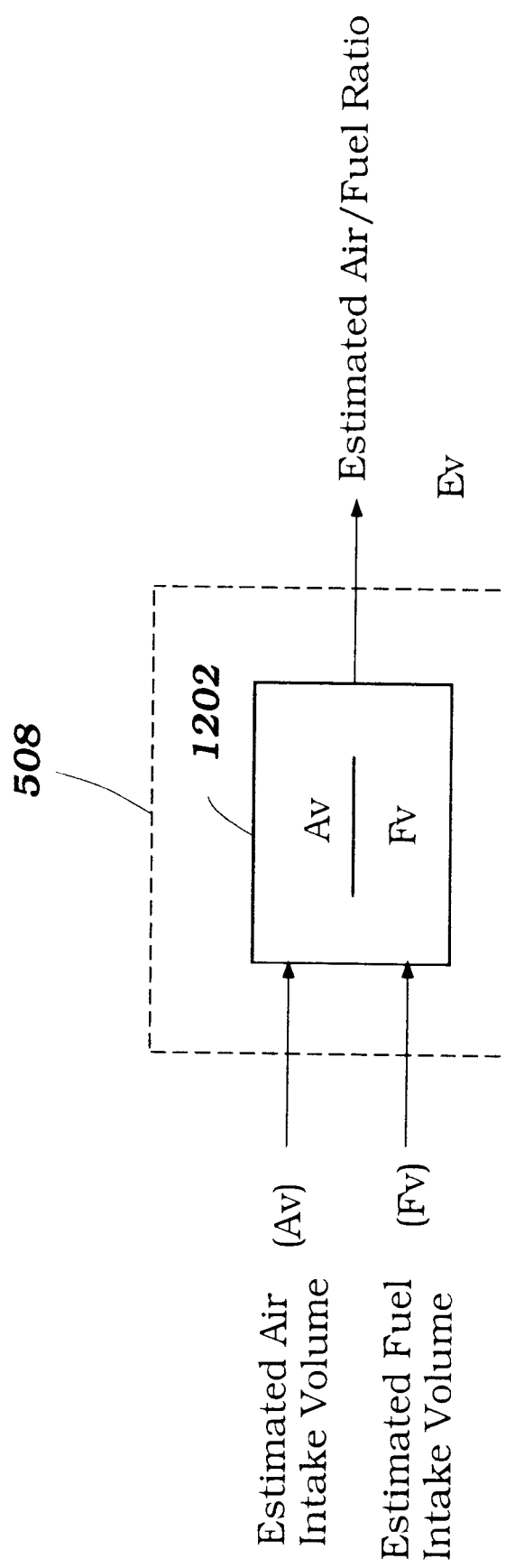
FIG. 12 is a block diagram showing a module for calculating a estimated air/fuel ratio based upon the estimated air intake volume and the estimated fuel intake volume for use in the model-based control system shown in FIG. 5.

FIG. 12 is a block diagram of the A/F estimator 508 for calculating an estimated air/fuel ratio Ev based upon the estimated air amount Av and the estimated fuel intake volume Fv, where Ev=Av/Fv.

Figure 13:
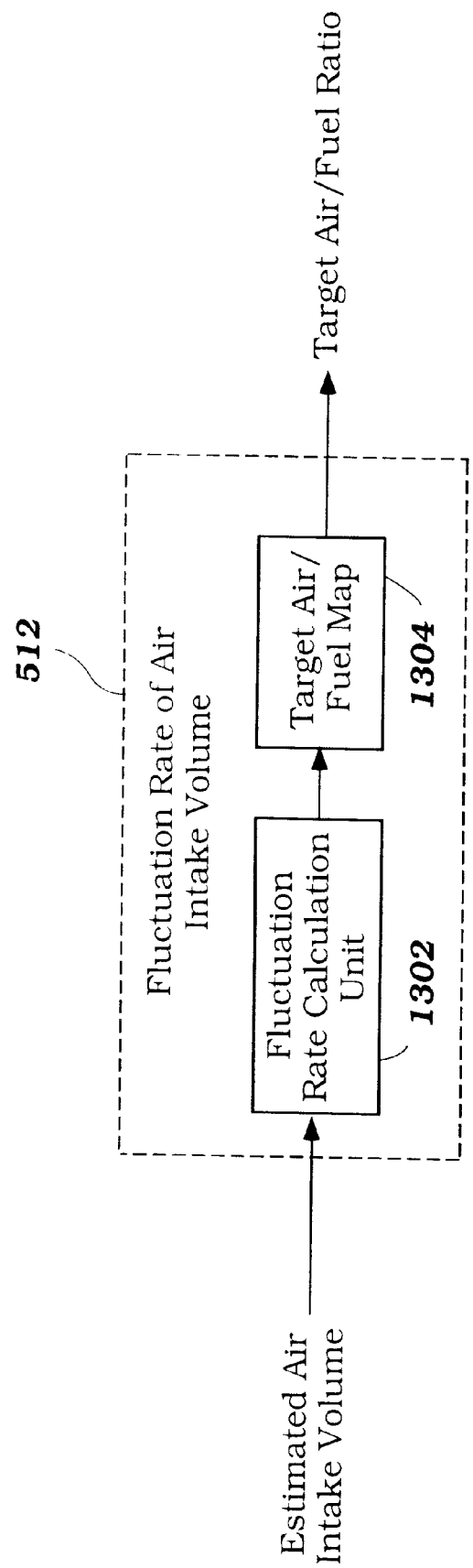
FIG. 13 is a block diagram showing a module for calculating a target air/fuel ratio for use in the model-based control system shown in FIG. 5.

FIG. 13 is a block diagram showing the target A/F ratio calculator 512 for calculating the target air/fuel ratio. In the calculator 512, the estimated air intake volume is provided to an input of a fluctuation rate calculator 1302. An output of the fluctuation rate calculator 1302 is provided to a target A/F map 1304. An output of the target A/F map is the target A/F ratio.

Figure 14:
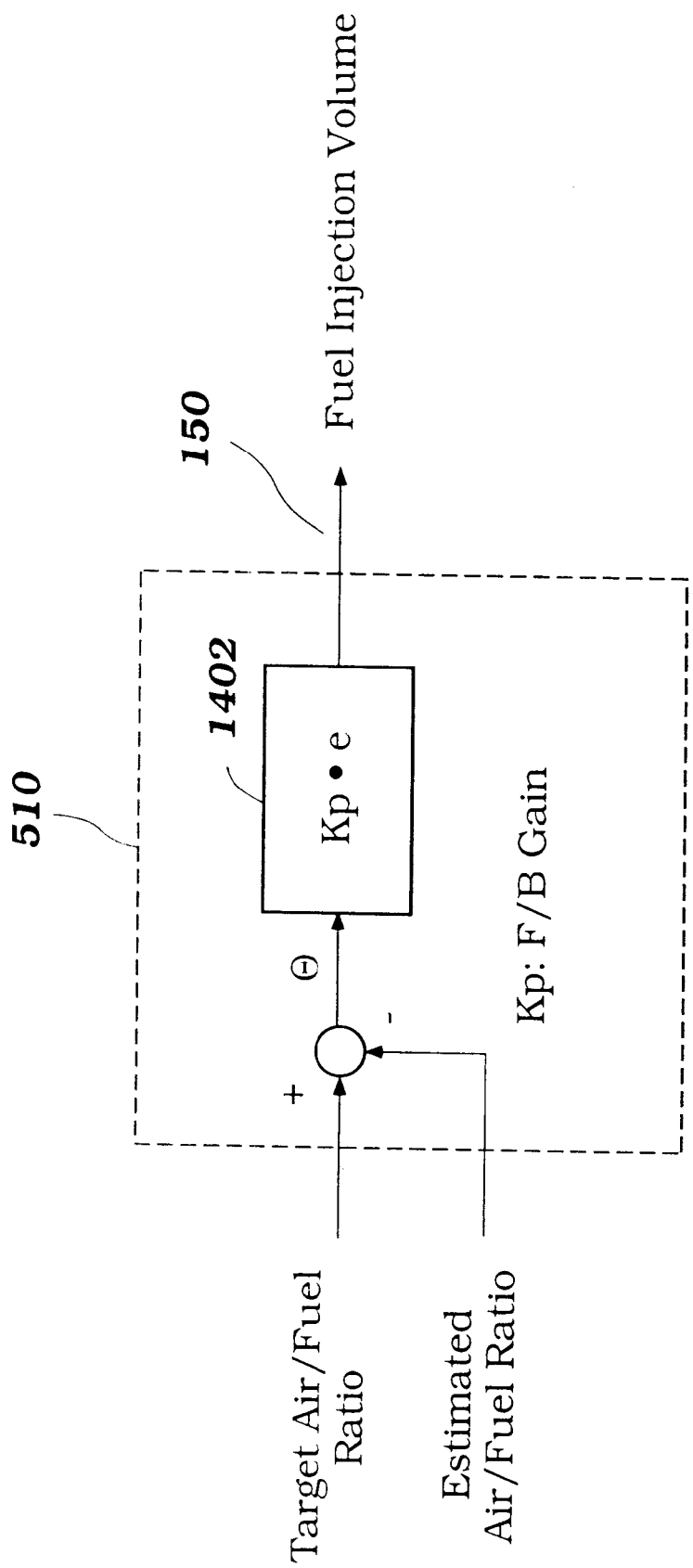
FIG. 14 is a block diagram showing a module for operating an internal feedback loop to bring the estimated air/fuel ratio close to the target A/F ratio in the model-based control system shown in FIG. 5.

FIG. 14 is a block diagram of the feedback calculator 510 for operating an internal feedback system to bring the estimated air/fuel ratio close to the target air/fuel ratio during online operation of the model-based control system 206. The calculator 510 computes the difference between the estimated A/F ratio provided by the A/F ratio estimator 508 and target A/F ratio provided by the target A/F calculator 512. The difference is multiplied by a feedback gain Kp to produce the injector signal 150 (Mf). The feedback calculator 510 is used during on-line learning while the controller 206 actually controls the engine 101.

Figure 15:
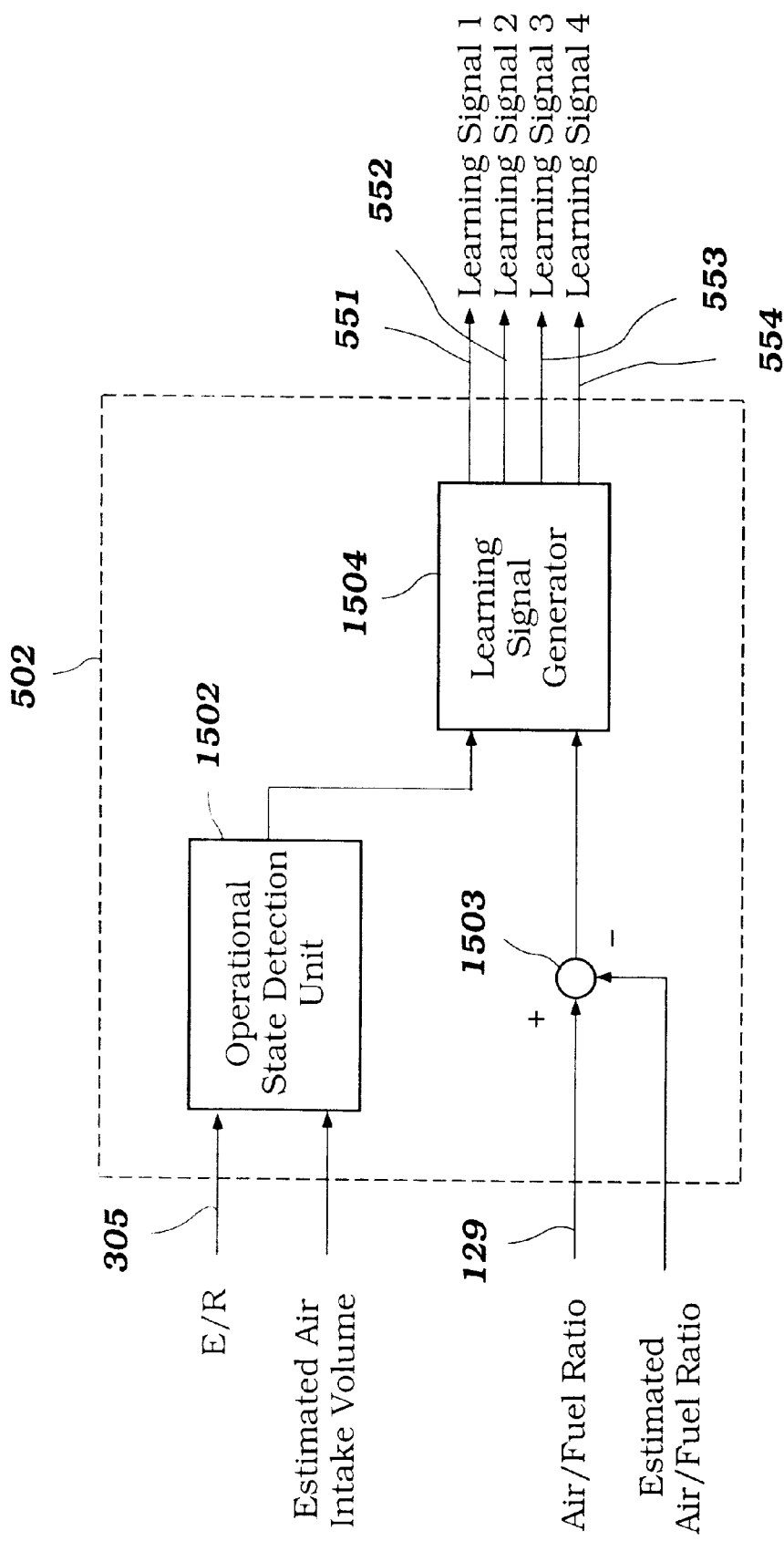
FIG. 15 is a block diagram showing a module for generating learning signals, in the model-based control system shown in FIG. 5.

FIG. 15 is a block diagram of the learning signal calculator 502 for generating the teaching signals 551–554. In the calculator 502, the engine speed E/R 305 and the estimated air intake volume are provided to respective inputs of an operational state detector 1502. An output of the operational state detector 1502 is provided to a first input of a learning signal generator 1504. Also in the calculator 502, the A/F ratio 129 is subtracted from the estimated A/F ratio, and the difference is provided to a second input of the learning signal generator 1504. The learning signal generator provides four learning signals 551–554 as outputs. Learning can be initiated automatically or upon user request.

Figure 16:
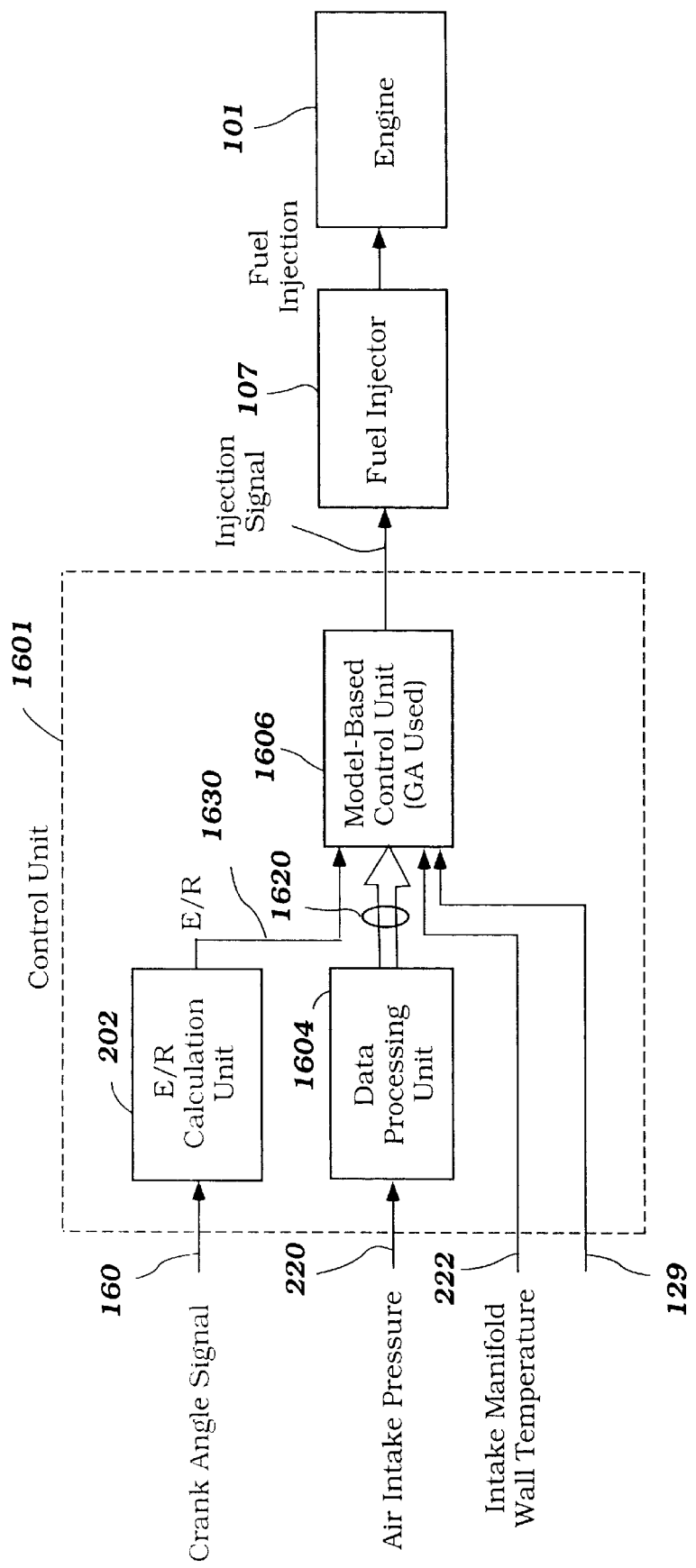
FIG. 16 is a block diagram showing a second engine control system.

FIG. 16 is a block diagram showing an engine system 1601 as a second embodiment of the control system 102. The control system 201 comprises an engine speed calculation module 202, a pressure data module 1604 for transforming air intake pressure data, and a model-base control module 1606. The engine speed calculation module 202 calculates engine speeds based upon the crank angle signal 160 by comparing the crank angle signal with time. The pressure data module 1604 transforms the intake pressure signal 220 (provided by the air intake manifold negative pressure sensor 124) into pressure signals 1620. The model-based control module 1606 accepts the engine speed signal 224, the pressure signals 1620, the intake manifold (inner) wall temperature signal 222, and the A/F ratio signal 129. An output of the model-based control module 1606 is the injector control signal (Mf) 150.

Figure 17:
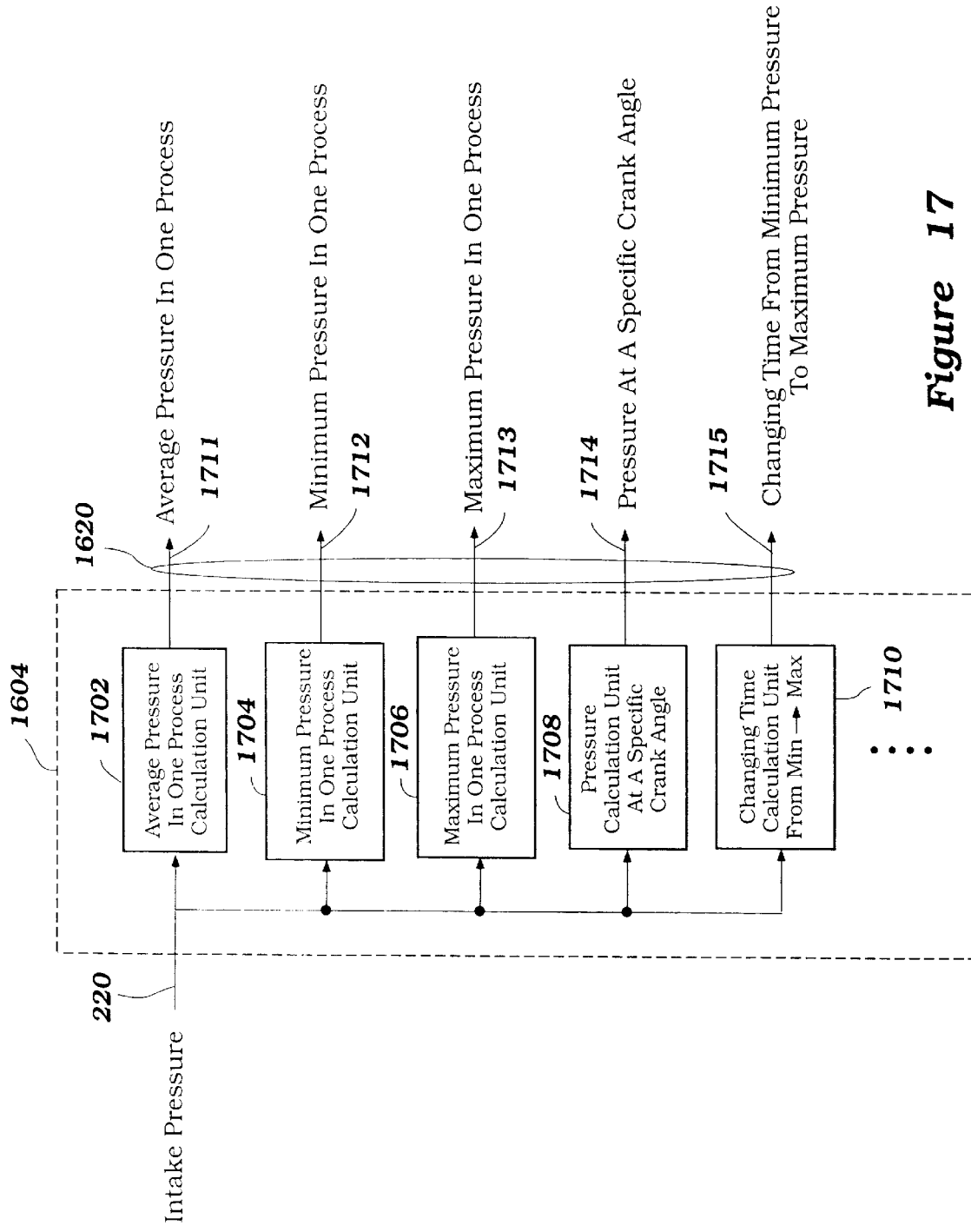
FIG. 17 is a block diagram showing a module for transforming intake pressure data into average pressure, minimum pressure, maximum pressure, and pressure at a specific crank angle for use by the control system shown in FIG. 16.

FIG. 17 is a block diagram of the pressure data module 1604 shown in FIG. 16. The pressure data module 1604 includes an averaging module 1702 for calculating an average pressure 1711 per stroke, a minimum pressure module 1704 for detecting the minimum pressure 1712 per stroke, a maximum pressure module 1706 for detecting the maximum pressure 1713 per stroke, a crank-pressure pressure module 1708 for detecting a pressure at a specific crank angle signal 1714, and a changing-time calculator 1710 for detecting the elapsed time 1715 between minimum and maximum pressure per stroke. The intake air pressure signal 220 is provided to an input of each of the modules 1702, 1704, 1706, 1708, 1710.

Figure 18:
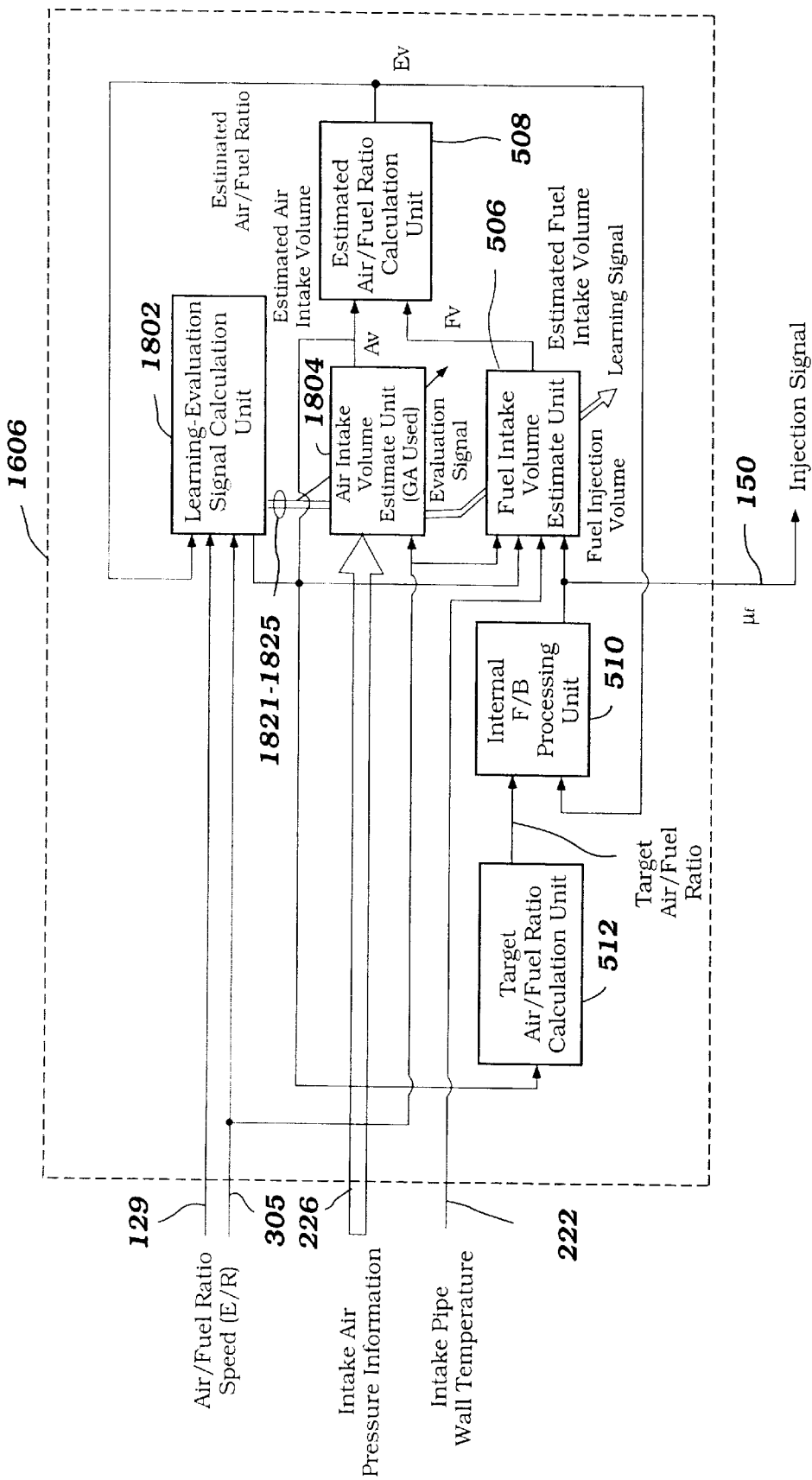
FIG. 18 is a block diagram showing a model-based control system used in the engine control system shown in FIG. 16.

FIG. 18 is a block diagram showing a model-based control system 1606 used in the engine control system 1601 shown in FIG. 16. The model-based control system 1606 includes a learning module 1802, an air intake volume estimator module 1804, the fuel volume estimator module 506, the A/F estimator module 508, the feedback module 510 and the target A/F ratio module 512.

The intake air estimator module 1804 is a forward model of the air charge system that is based on the behavior of the air charge in the air intake manifold 103. The intake air estimator 1804 accepts the pressure signals 1620 and the E/R signal 305, and provides an estimated air intake volume. The fuel volume estimator 506 is a forward model of the fuel system that is based on behavior of the fuel injected into the air intake manifold 103 by the fuel injector 107. The fuel volume estimator 506 accepts the E/R signal 305, the estimated intake air signal 504, the intake manifold wall temperature signal 222, and the injector control signal 150 and provides a estimated A/F ratio signal.

The A/F estimator 508 accepts the estimated intake air volume signal and the estimated fuel intake volume signal and provides the estimated A/F ratio signal. The target A/F module 512 accepts the estimated intake air volume signal and provides a target A/F ratio signal. The feedback module 510 accepts the target A/F ratio signal and the estimated A/F ratio and provides the injector signal Mf 150.

The learning module 1802 accepts the A/F ratio signal 129 provided by the air fuel ratio sensor 123, the E/R signal 305, the estimated intake air volume signal, and the estimated A/F ratio signal; and provides learning data signals 1821–1825 to a learning input of the air intake volume estimator 504 and the fuel intake volume estimator 506. The learning module 1802 also provides an evaluation signal to the air intake volume estimator 1804.

Figure 19:
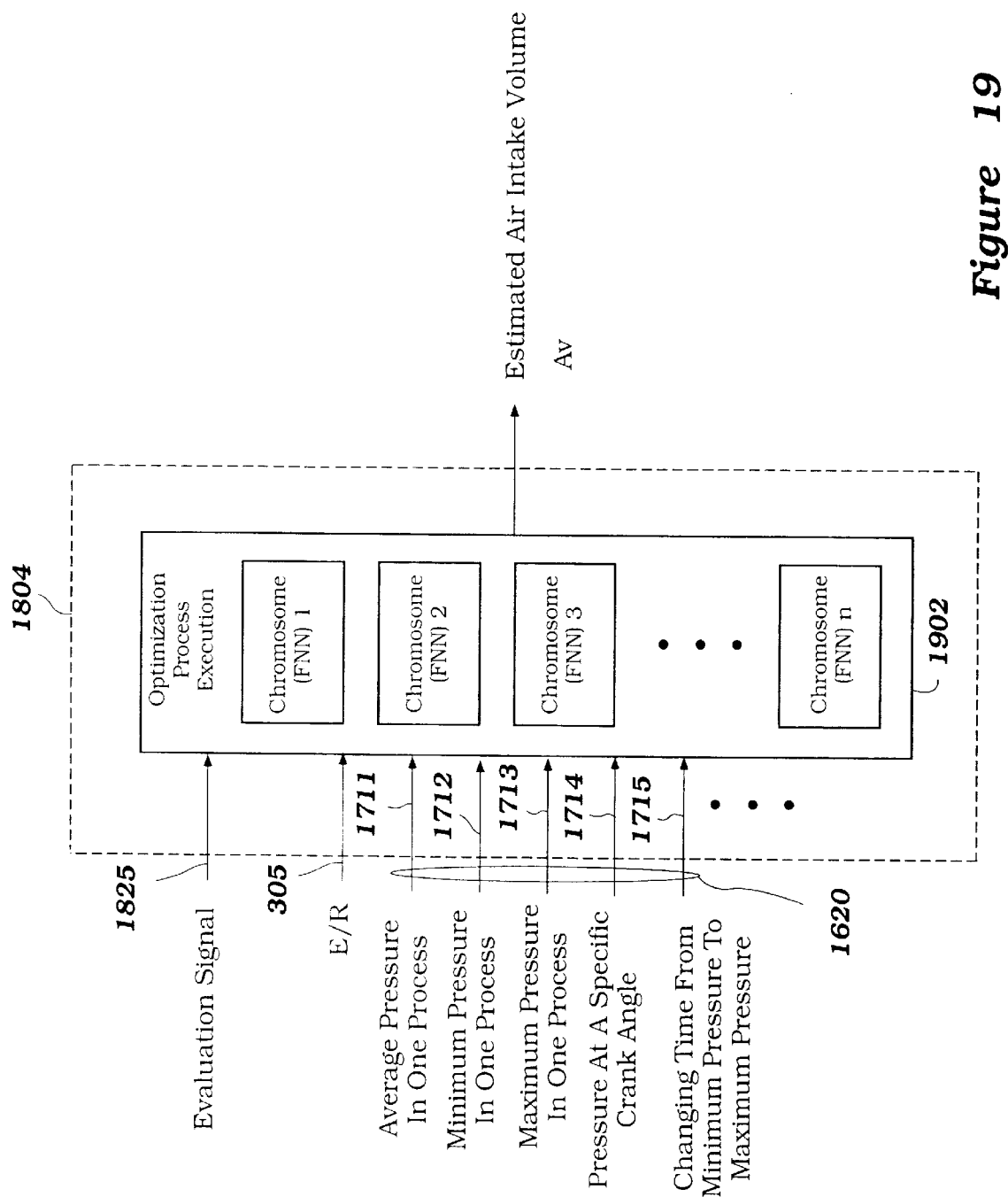
FIG. 19 is a block diagram showing a module for calculating an estimated intake air volume in the model-based control system shown in FIG. 18.

FIG. 19 is a block diagram of the air intake volume estimator 1804. In the estimator 1804, the evaluation signal 1825, the engine speed E/R 305, and the pressure signals 1620 are provided to an optimization unit 1902. The evaluation signal 1825 directs the optimization unit 1902 to calculate the estimated air intake volume (Av) using fuzzy neural networks 1-n, where each FNN is associated with an individual (i.e. a chromosome) generated by a genetic optimizer. The fuzzy neural networks compute the estimated air intake volume using the engine speed E/R 305 and the pressure signals 1620 as inputs. The output of the optimization unit 1902 is the estimated air intake volume. The optimization unit 1902 operates as described in connection with FIG. 7 and it generates chromosomes as described in connection with FIG. 8.

Figure 20:
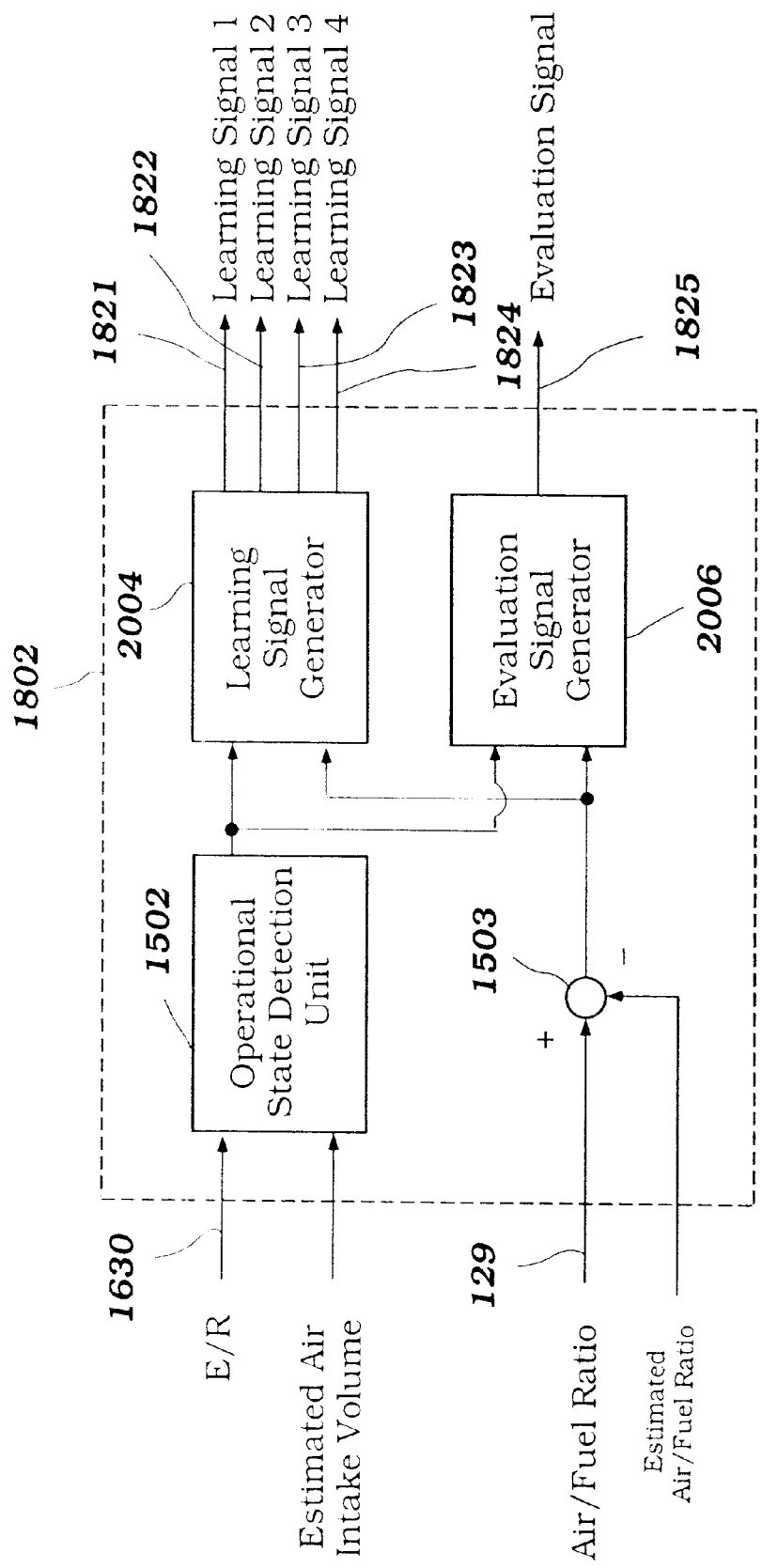
FIG. 20 is a block diagram showing a module for generating learning signals and evaluation signals for use in the model-based control system shown in FIG. 18.

FIG. 20 is a block diagram showing a module for generating learning signals and evaluation signals for use in the model-based control system shown in FIG. 18. FIG. 20 is a block diagram of the learning signal calculator 1802 for generating the teaching signals 1821–1824 and the evaluation signal 1825. In the calculator 1802, the engine speed E/R 305 and the estimated air intake volume are provided to respective inputs of an operational state detector 1502. An output of the operational state detector 1502 is provided to a first input of a learning signal generator 2004 and to a first input of an evaluation signal generator. Also, in the calculator 502, the A/F ratio 129 is subtracted from the estimated A/F ratio and the difference is provided to a second input of the learning signal generator 1504 and to a second input of the evaluation signal generator 2006. The learning signal generator provides the four learning signals 1821–1824 as outputs. The evaluation signal generator provides the evaluation signal 1825 as an output.

FIG. 21 shows a chromosome structure for encoding coupling coefficients of the FNN, as genetic information.

Figure 22A:
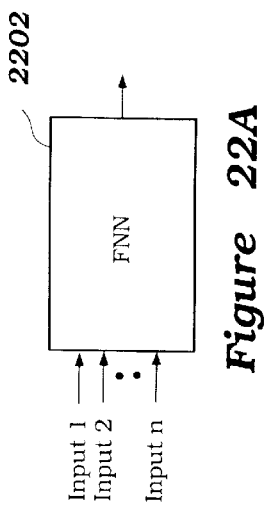
FIGS. 22A–22C illustrates neural network topologies.
Figure 22C:
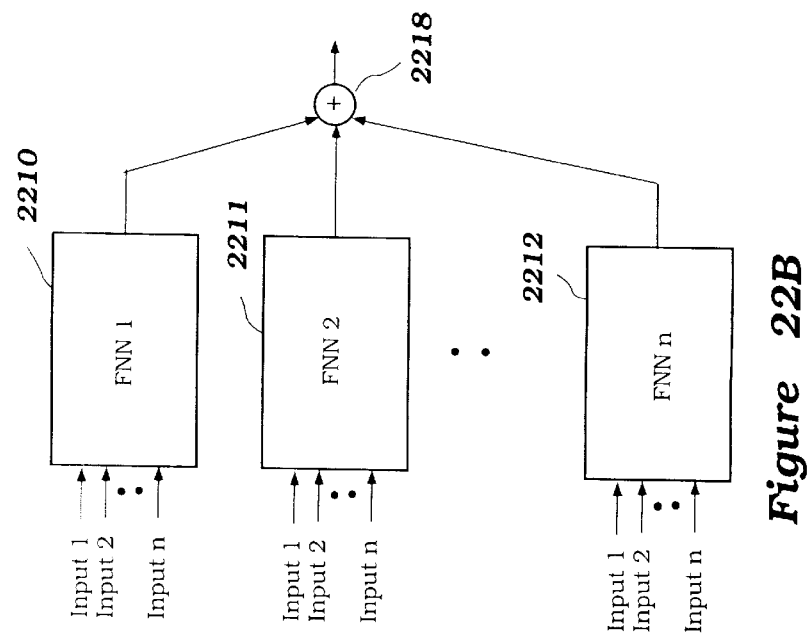
Figure 22B:
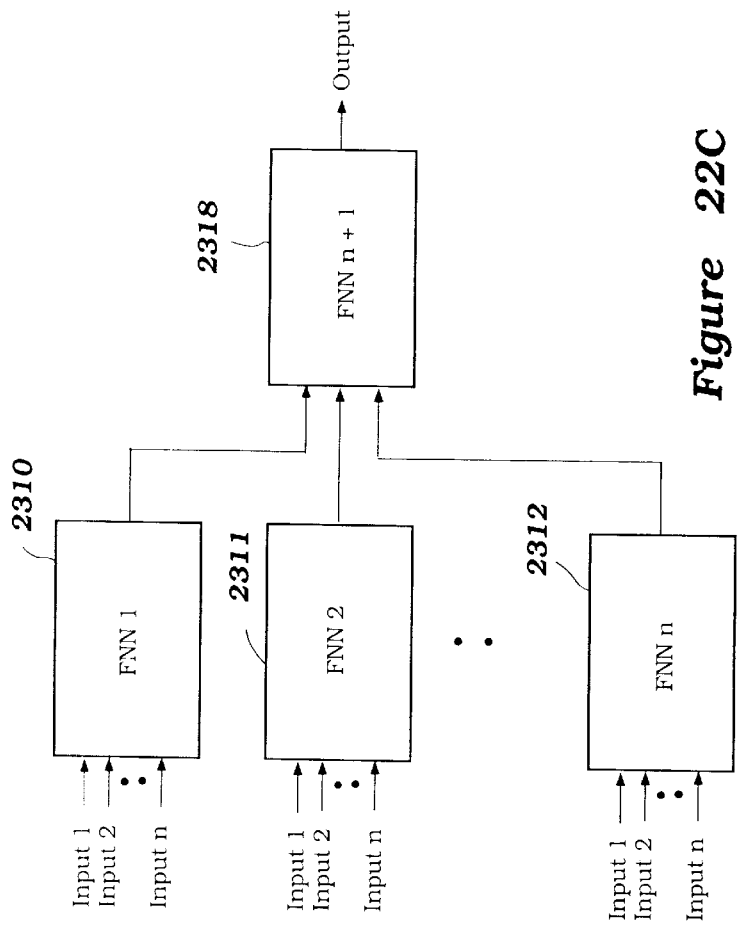

FIGS. 22A–22C illustrate neural network topologies useful with the present disclosure. All of the topologies shown in FIGS. 22A–22C have n inputs and one output.

FIG. 22A shows a single FNN having n inputs and one output similar, for example, to the FNN shown in FIG. 6.

FIG. 22B shows a compound FNN having n fuzzy neural networks, shown as a first network 2210, a second network 2211, and an n'th network 2212. Inputs 1-n are provided to each of the n neural networks. Each of the n neural networks produces an output. The outputs are summed by an adder 2218 to produce a single output for the compound FNN.

FIG. 22C shows a second compound FNN having n fuzzy neural networks, shown as a first network 2310, a second network 2311, and an n'th network 2312. Inputs 1-n are provided to each of the n neural networks. Each of the n neural networks produces an output. The n outputs are provided as inputs to a FNN 2318. The FNN 2318 produces a single output.

Figure 23:
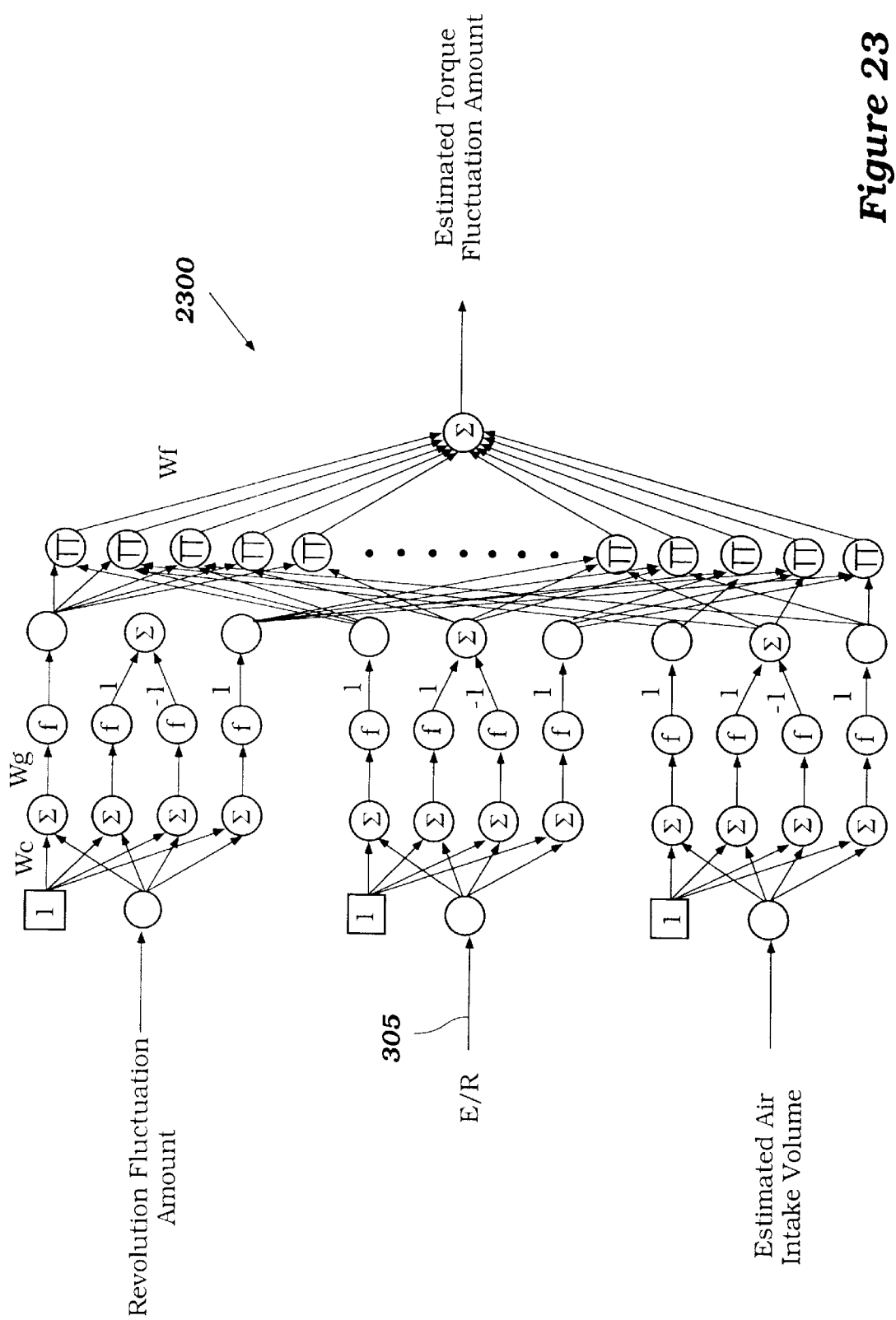
FIG. 23 shows an example of a neural network optimized for estimating a torque fluctuation amount.

FIG. 23 shows a FNN 2300 for estimating a torque fluctuation amount. The as FNN 2300 is similar in structure to the FNN 609 shown in FIG. 6, having six levels, three inputs, one output, and parameters $w_c$, $w_g$, and $w_f$. The inputs to the FNN 2300 are a revolution fluctuation value, the engine speed E/R 305 and the estimated air intake volume.

Figure 24:
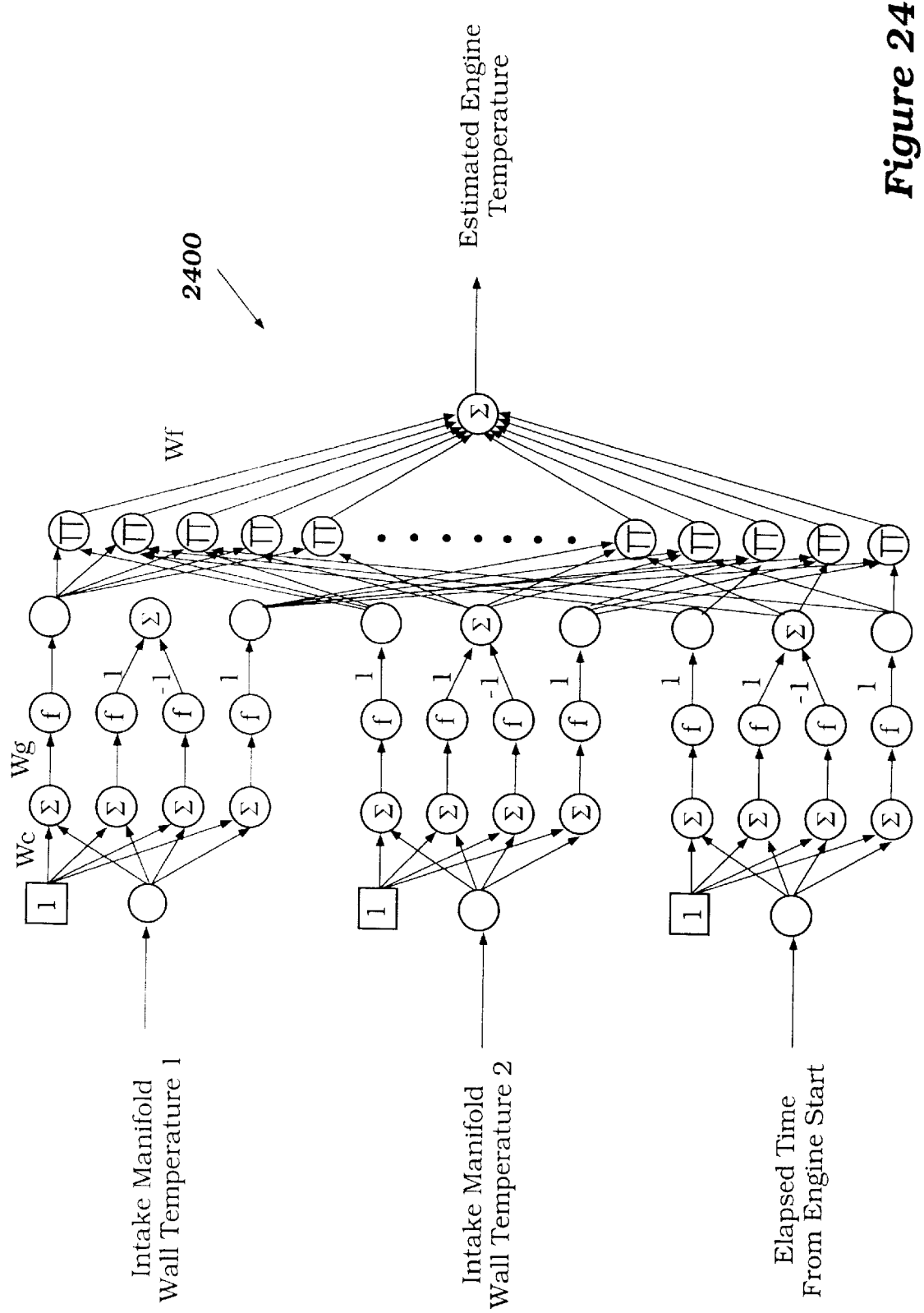
FIG. 24 shows an example of a neural network optimized for estimating engine combustion chamber temperature.

FIG. 24 shows a FNN 2400 for estimating engine combustion chamber temperature. The FNN 2400 is similar in structure to the FNN 609 shown in FIG. 6, having six levels, three inputs, one output, and parameters $w_c$, $w_g$, and $w_f$. The inputs to the FNN 2400 are a first intake manifold wall temperature, a second intake manifold wall temperature and an elapsed time since engine startup.

Figure 25:
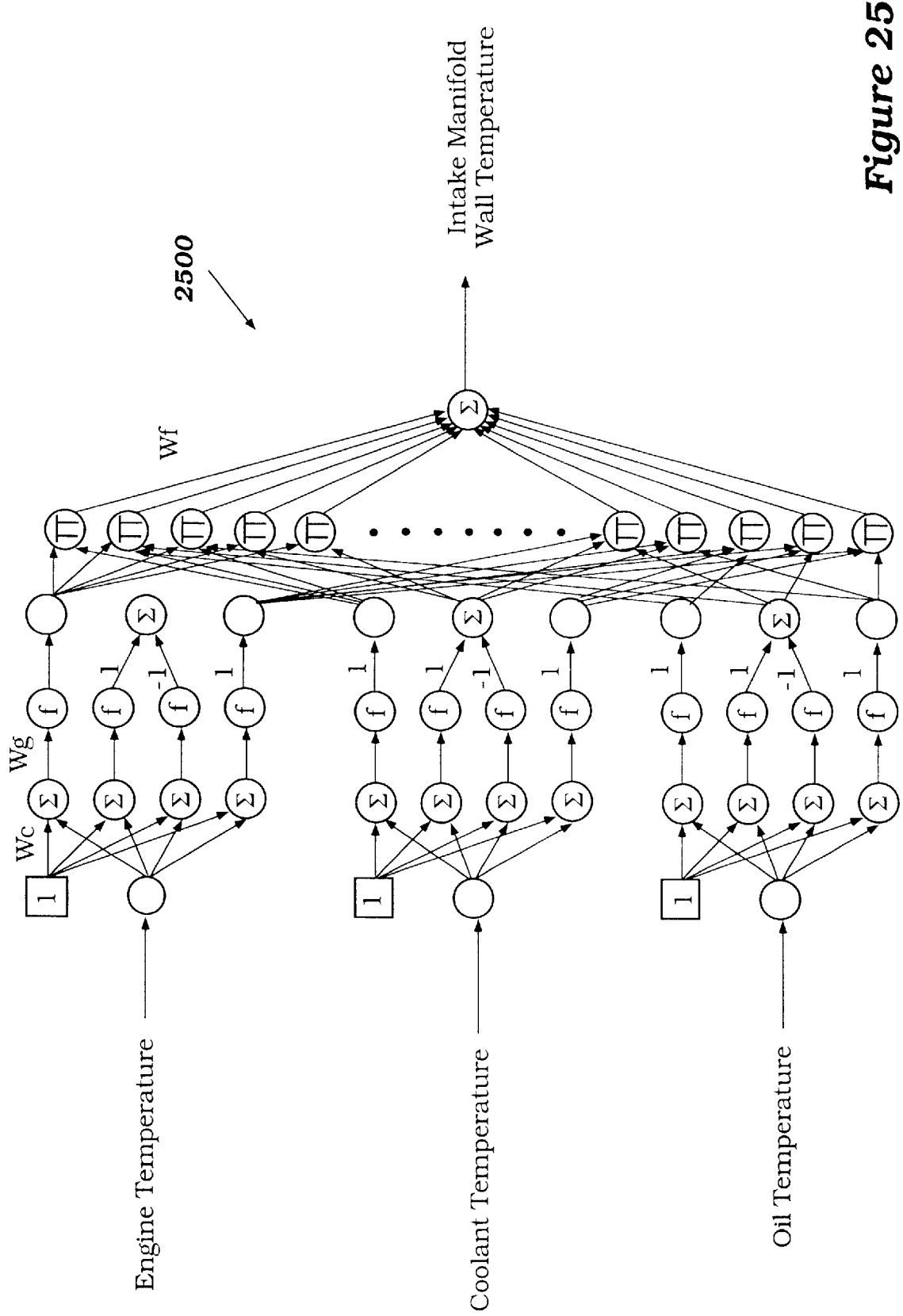
FIG. 25 shows an example of a neural network optimized for estimating an intake manifold wall temperature.

FIG. 25 shows a FNN 2500 for estimating an intake manifold wall temperature. The FNN 2500 is similar in structure to the FNN 609 shown in FIG. 6, having six levels, three inputs, one output, and parameters $w_c$, $w_g$, and $w_f$. The inputs to the FNN 2500 are an engine temperature, an engine coolant temperature, and an oil temperature.

The FNN 2300, the FNN 2400, and the FNN 2500 can be optimized using a genetic algorithm as discussed in connection with FIGS. 6–8.

Although this invention has been described in terms of a certain embodiment, other embodiments apparent to those of ordinary skill in the art also are within the scope of this invention. Various changes and modifications may be made without departing from the spirit and scope of the invention. For example, one skilled in the art will recognize that the controllers, fuzzy neural networks, estimators and/or genetic algorithms described herein can be implemented in software, in hardware, or in combinations of hardware and software. Accordingly, the scope of the invention is defined by the claims that follow.

What is claimed is:

1. An optimization method for a FNN in which a calculation process for fuzzy reasoning values includes a neural network structure, and parameters to be identified or adjusted by fuzzy reasoning are corresponded to a coupling load of said neural network, and an adjustment of fuzzy rules and/or membership functions is performed by renewing the coupling load by a learning process, comprising the steps of: identifying candidate input data signals for a FNN; coding information regarding use of said candidate input data signals into a chromosome structure for a genetic algorithm and generating a plurality of individuals from said chromosome structure; and optimizing a selection of said candidate input data signals to be used as inputs for said FNN by using said genetic algorithm to select an optimum individual chromosome.

2. The optimization method of claim 1, further comprising the steps of coding the coupling load of the FNN corresponding to membership functions of the FNN into said chromosome structure, and evolving an optimum individual chromosome using said genetic algorithm.

3. The optimization method of claim 1, wherein said FNN is employed for control of an internal combustion engine.

4. The optimization method of claim 3, wherein said candidate input data comprises an engine intake pressure and said output data comprises an engine air intake volume.

5. The optimization method of claim 3 wherein said candidate input data includes at least one of a combustion chamber pressure, a fluctuation of engine speed, engine speed, and an air intake volume, and said output data comprises an engine torque fluctuation.

6. The optimization method of claim 3, wherein said candidate input data includes at least one of an intake manifold wall temperature, an ambient temperature of the intake manifold, and an elapsed time from engine start, and said output data comprises a combustion chamber temperature of said engine.

7. The optimization method claim 3, wherein said candidate input data includes at least one of a coolant temperature, an oil temperature, and an engine temperature, and said output data comprises and intake manifold wall temperature.

8. The optimization method of claim 3, wherein said candidate input data includes at least one of an intake manifold wall temperature, an engine speed, an engine air intake volume, and an engine intake air negative pressure, and said output data comprises an evaporation time constant for fuel deposited into the intake manifold.

9. The optimization method of claim 3, wherein said candidate input data includes at least one of an engine speed, an air intake volume, and an intake air negative pressure, and said output data comprises a flow rate of fuel injected into an intake manifold.

10. The optimization method for a fuzzy neural circuit network of claim 9, wherein said candidate input data includes at least one of a fluctuation rate of throttle angles and a fluctuation rate of engine speed.

11. An engine control system comprising a fuel injector and control means for controlling said fuel injector by using a genetic algorithm to optimize a structure of a FNN.

12. A method for optimizing a FNN comprising the steps of: identifying configuration parameters for a FNN; coding information regarding use of said parameters as genes in a chromosome for a genetic algorithm and generating a plurality individuals from said chromosome; and using said genetic algorithm to select an optimum individual.

13. The method of claim 12 wherein said chromosome includes genes that code for a location of a center of a sigmoid function of a member of said FNN.

14. The method of claim 12 wherein said chromosome includes genes that code for a location of a slope of a sigmoid function of a member of said FNN.

15. The method of claim 12 wherein said chromosome includes genes that code for selection of input data for said FNN from a set of candidate input data.

16. The method of claim 12 wherein said chromosome includes genes that code for a member function number.

17. The method of claim 12 wherein said genetic algorithm includes a fitness function based on said FNN.

18. The method of claim 17 wherein said genetic algorithm selects an individual that satisfies said fitness function to within a specified tolerance.

* * * * *

UNITED STATES PATENT AND TRADEMARK OFFICE
CERTIFICATE OF CORRECTION

PATENT NO. : 6,349,293 B1
DATED : February 19, 2002
INVENTOR(S) : Masashi Yamaguchi It is certified that error appears in the above-identified patent and that said Letters Patent is hereby corrected as shown below:

<u>Title page,</u>
Item [30], Foreign Application Priority Data, insert:
-- May 20, 1998 (JP) ………….. 10-138545 --

Signed and Sealed this

Seventeenth Day of September, 2002

Attest:

JAMES E. ROGAN
Attesting Officer
Director of the United States Patent and Trademark Office